United States Patent
Logan et al.

(10) Patent No.: US 10,840,482 B2
(45) Date of Patent: Nov. 17, 2020

(54) BATTERY COIL ENGAGING MEMBERS FOR DOWNHOLE TOOLS

(71) Applicant: Evolution Engineering Inc., Calgary, Alberta (CA)

(72) Inventors: Justin Christopher Logan, Calgary (CA); Aaron William Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 186 days.

(21) Appl. No.: 15/918,961

(22) Filed: Mar. 12, 2018

(65) Prior Publication Data

US 2018/0261805 A1 Sep. 13, 2018

Related U.S. Application Data

(60) Provisional application No. 62/469,770, filed on Mar. 10, 2017.

(51) Int. Cl.
| | |
|---|---|
| *H01M 2/02* | (2006.01) |
| *H01M 2/04* | (2006.01) |
| *E21B 41/00* | (2006.01) |
| *E21B 47/10* | (2012.01) |
| *H01M 2/10* | (2006.01) |

(Continued)

(52) U.S. Cl.
CPC ....... *H01M 2/0275* (2013.01); *E21B 41/0085* (2013.01); *E21B 47/101* (2013.01); *H01M 2/022* (2013.01); *H01M 2/0232* (2013.01); *H01M 2/0267* (2013.01); *H01M 2/046* (2013.01); *H01M 2/0413* (2013.01); *H01M 2/0417* (2013.01); *H01M 2/0421* (2013.01); *H01M 2/0443* (2013.01); *H01M 2/0447* (2013.01); *H01M 2/0482* (2013.01); *H01M 2/08* (2013.01); *H01M 2/105* (2013.01); *H01M 2/1055* (2013.01); *H01M 2/12* (2013.01); *H01M 2/14* (2013.01); *H01M 2/1646* (2013.01); *H01M 2/1653* (2013.01); *H01M 2/18* (2013.01); *H01M 2/263* (2013.01); *H01M 10/052* (2013.01); *H01M 10/39* (2013.01)

(58) Field of Classification Search
CPC .. H01M 2/022; H01M 2/0232; H01M 2/0275; H01M 2/0447; H01M 2/046; E21B 41/0085
USPC ......................................................... 429/180
See application file for complete search history.

(56) References Cited

U.S. PATENT DOCUMENTS

| | | |
|---|---|---|
| 4,499,955 A | 2/1985 | Campbell et al. |
| 5,660,942 A | 8/1997 | Kothari |

(Continued)

FOREIGN PATENT DOCUMENTS

| | | |
|---|---|---|
| CA | 2570554 A1 | 1/2006 |
| CA | 2605458 A1 | 11/2006 |

(Continued)

OTHER PUBLICATIONS

USPTO, Non-Final Office Action in corresponding U.S. Appl. No. 15/918,947, dated Dec. 19, 2019, 18 pages.

*Primary Examiner* — James M Erwin
(74) *Attorney, Agent, or Firm* — NK Patent Law

(57) ABSTRACT

Arrangements for retaining coiled battery internals in a coiled orientation within a cell casing, in which end caps and/or sleeves are provided with at least one inward-facing protuberance for engaging and securing the coiled battery internals, and means for securing and aligning pouch cell batteries within a sleeve.

37 Claims, 17 Drawing Sheets

(51) Int. Cl.
*H01M 2/16* (2006.01)
*H01M 2/26* (2006.01)
*H01M 2/14* (2006.01)
*H01M 2/18* (2006.01)
*H01M 2/12* (2006.01)
*H01M 2/08* (2006.01)
*H01M 10/39* (2006.01)
*H01M 10/052* (2010.01)

(56) References Cited

U.S. PATENT DOCUMENTS

| | | |
|---|---|---|
| 6,146,785 A | 11/2000 | Rigobert et al. |
| 7,911,766 B2 | 3/2011 | Caumont et al. |
| 8,048,558 B2 | 11/2011 | Phillips et al. |
| 8,968,919 B2 | 3/2015 | Caumont et al. |
| 9,023,500 B2 | 5/2015 | Kim et al. |
| 2006/0257735 A1 | 11/2006 | Kim |
| 2008/0160393 A1 | 7/2008 | Kim et al. |
| 2011/0052974 A1 | 3/2011 | Kim |
| 2011/0064982 A1 | 3/2011 | Liu |
| 2013/0026978 A1 | 1/2013 | Cooley et al. |
| 2013/0078503 A1 | 3/2013 | Kim |
| 2013/0224546 A1 | 8/2013 | Hama et al. |
| 2015/0280179 A1 | 10/2015 | Liu |

FOREIGN PATENT DOCUMENTS

| | | |
|---|---|---|
| CA | 2720078 A1 | 10/2009 |
| JP | 01-259511 A | 10/1989 |
| JP | 07-220716 A | 8/1995 |
| JP | 08-153511 A | 6/1996 |
| JP | 10-261430 A | 9/1998 |
| JP | 11-031487 A | 2/1999 |
| JP | 3163503 B2 | 5/2001 |
| JP | 2002-100343 A | 4/2002 |
| KR | 10-2000-0018605 A | 4/2000 |
| KR | 10-2000-0066690 A | 11/2000 |
| KR | 10-2005-0110504 A | 11/2005 |
| KR | 10-2008-0018471 A | 2/2008 |
| WO | 2014171559 A1 | 10/2014 |

BATTERY COIL ENGAGING MEMBERS FOR DOWNHOLE TOOLS

CROSS-REFERENCE TO RELATED APPLICATIONS

This application claims priority to U.S. Provisional Patent Application No. 62/469,770 filed on Mar. 10, 2017, the entire content of which is incorporated by reference herein.

FIELD OF THE INVENTION

This invention is in the field of power supplies for downhole drilling tools, and more specifically, to cylindrical batteries for downhole instruments.

BACKGROUND

Downhole drilling is required in many fields to evaluate subsurface materials and to extract minerals and other natural resources. Such fields include mining and the recovery of hydrocarbons in oilfield drilling. Drilling is also known for use in excavation activities such as for utility installation.

Recovering hydrocarbons from subterranean zones relies on the process of drilling wellbores. Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid usually in the form of a drilling "mud" is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly ("BHA") is the name given to the equipment at the terminal downhole end of a drill string. In addition to a drill bit, a BHA may comprise elements such as: apparatus for steering the direction of the drilling (e.g., a steerable downhole mud motor or rotary steerable system); sensors for measuring properties of the surrounding geological formations (e.g., sensors for use in well logging); sensors for measuring downhole conditions as drilling progresses; systems for telemetry of data to the surface; stabilizers; and heavy weight drill collars, pulsers and the like. The BHA is typically advanced into the wellbore by a string of metallic tubulars (also called drill pipe).

Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, and hydrocarbon size and location. A crew may make intentional deviations from the planned path as necessary based on information gathered from downhole sensors and transmitted to the surface by telemetry during the drilling process. The ability to obtain real time data allows for relatively more economical and more efficient drilling operations. Various techniques have been used to transmit information from a location in a borehole to the surface. These include transmitting information by generating vibrations in fluid in the borehole (e.g., acoustic telemetry or mud pulse telemetry) and transmitting information by way of electromagnetic signals that propagate at least in part through the earth (electromagnetic or "EM" telemetry). Other telemetry systems use hardwired drill pipe or fibre optic cable to carry data to the surface.

The process of transmitting information from a location in the borehole to the surface and other downhole activities can require a downhole power source. For example, with typical measurement while drilling ("MWD") equipment required for operational control or data analysis, MWD measurements are taken downhole with an electromechanical device located in the BHA. These MWD tools need electrical energy from a power supply for their operation in the borehole. A power supply generally comprises an electrical storage and generator for generating electrical output. The electrical storage could be a chemical battery such as an aluminum electrolytic capacitor, tantalum capacitor, ceramic and metal film capacitor, or hybrid capacitor magnetic energy storage. The electrical storage could also be a mechanical energy storage device such as a fly wheel, spring system, spring-mass system, thermal capacity system, or hydraulic or pneumatic system. In MWD systems, the MWD equipment can be coupled to an electronics package along the drill string, which in turn can be coupled to a power supply along the drill string that provides power to the downhole electronics. MWD can use either battery power systems or turbine power systems, although unlike turbine systems, batteries can provide power to the MWD system independent of drilling-fluid circulation and are necessary if logging will occur during tripping in or out of the borehole. Thus, the typical main energy source for these purposes is batteries. Lithium batteries (such as lithium-thionyl chloride batteries) are commonly used in MWD systems because of their combination of high energy density, even at high MWD service temperatures, and the provision of a stable voltage source until very near the end of their service life, and they usually do not require complex electronics to condition the power supply.

An electrical storage cell typically comprises a pair of electrodes (anode and cathode) comprising electrochemically active positive and negative materials, respectively, each having a respective current collector. The current collectors are metal contacts or leads that form terminals and provide electrical access to the appropriate layer of the energy storage cell. The electrodes are typically separated from one another by a separator. The electrical storage cell oftentimes appears as a thin flat layer with the separator between the electrodes. To construct the electrical storage cell, an insulating sheet is typically laid down, with a thin layer of an anode material on top, a separator layer is applied, and then the cathode material is layered on top. These sandwich layers are then rolled up into a cylindrical cell to form what is often called a "jelly roll" or "Swiss roll", with respective current collectors projecting at each end of the jelly roll. The wound storage cell can then be secured with a wrapper or packaged in a hollow cylindrical casing and hermetically sealed with a liquid electrolyte. An example of such a prior art design is illustrated in FIGS. 1*a* and 1*b*, where a battery coil 1 is configured for retention in a casing 2, which casing 2 is sealed at opposed ends by caps 3. This jelly roll design is the design most commonly used for cylindrical rechargeable batteries such as nickel-cadmium, nickel-metal hydride, and lithium ion, but can also be used for primary or non-rechargeable batteries. FIGS. 2*a* to 2*c* illustrate sectional views of conventional cell designs, namely the high-rate "jelly roll" design (FIG. 2a), the moderate-rate construction (FIG. 2b), and the bobbin design (FIG. 2c).

The casing for the jelly roll storage cell can provide structure and physical protection for the storage cell. The casing is typically an annular cylindrically shaped body and a complementary cap or plate on one or both ends of the casing. Current collectors of the electrodes are connected to the electrical connection means of the caps that cover them. The seal between the casing and the caps can prevent access to the internal environment of the storage cell, for example by air and humidity. It also prevents leakage of the electrolyte from the storage cell. When the jelly roll is sealed within the casing, the current collectors are connected to the casing. The current collectors can be electrically coupled to the casing by use of a feed through or can be directly coupled to the casing.

In use, the wound electrodes are surrounded by the liquid electrolyte. The porous separator isolates the electrodes mechanically to prevent an internal short circuit, while allowing ion flow or diffusion to occur. The electrical potential difference between the anode and cathode allows electron flow, or current, to be provided from the anode when a conductive path or electronic device is connected to the battery. The cell will cease producing electric power when electron flow stops for a variety of reasons. Some of these reasons include mechanical failure such as if ions cannot reach the cathode, when the external current path is interrupted, or if the anode contacts the cathode.

In downhole drilling, a long drill string and rotating drill bit drill a wellbore into the Earth, requiring power downhole. The power supply or battery cell could be disposed along the drill string. Since the wellbores that must be drilled into the Earth in these cases are required to be very large and a great amount of energy is consumed while downhole, the batteries that are used in downhole drilling are large industrial-sized batteries.

In MWD tools in particular, the battery is large and is often positioned directly above the drill bit, placing the battery in one of the toughest environments in drilling. The very harsh subsurface operating environments of MWD systems not only include high temperature and pressure, but also downhole shock and vibration that can be problematic with strong lateral and axial shocks to the system. The batteries must be able to withstand the rigorous mechanical shocks and vibrations of the downhole environment, while providing continuous power to operate the tool. Included in the problems with downhole shock and vibration are problems with torsional shock which can be produced by stick/slip torsional accelerations. These shocks may be significant and the tools can be expected to fail if subjected to repeated stick/slip because of mechanical damage to tool string components, including the battery.

Stick/slip is a violent reaction to built-up torsional energy along the length of the drill string. It can occur as the formation strength increases and more weight on bit ("WOB") is required to maintain efficient depths of cut. The stick/slip phenomenon is a spontaneous jerking motion that can happen as two objects are sliding over one another. The surfaces alternate between sticking to one another and sliding over each other, with a corresponding change in the force of friction. When an applied force is large enough to overcome the static friction between the surfaces, the reduction of the friction to the kinetic friction can cause a sudden jump in the velocity of the movement. Stick-slip can thus occur at the rock-cutting interface where the cutters meet the rock or can be produced by friction between the hole wall and the drill string itself. When stick/slip takes place at the end of the drill string, an accumulation and release of energy stored as several turns of twist in the string can occur. During the "stick" period, the bit stops drilling while WOB and torque on bit ("TOB") remain being applied. As the rotary table on the rig floor continues to turn, the resulting torque loading on the drill string can cause the bit to eventually give way or "slip", causing a significant increase in its rotational speed. In this slip or release phase, the string spins out of control and creates the stick/slip-associated vibrations that can be destructive.

The stick-slip vibration can cause periodic fluctuations in bit rotational speed, ranging from zero to more than five times the rotational speed measured at the surface on the rig floor. When mud motors are used, the stick/slip torsional wave to the surface is reduced, but still imparts vibrations that can damage guidance electronics and cause damage to the battery. Stick/slip has been regarded as the most detrimental vibration axis to the service life of downhole equipment because the torsional movement and axial vibrations of stick/slip can generate or result in mechanical stress to the tool and in particular, the battery cell can be deformed due to the rotation of the structure.

As the drill string rotates in the wellbore, there is concurrent rotation of the battery cell casing. The high shock and vibration resulting from the stick/slip phenomenon can cause the inner storage cell to move independently of the casing, causing an unrolling of the wound jelly roll storage cell. This can result in accidental anode and cathode contact, thus short-circuiting the battery. When this happens, heat and gas can be produced in an accelerated chemical reaction and explosions can occur if the cell temperature rises high enough.

Downhole failure of the battery such as this can be both dangerous and expensive. A short circuited battery can cause leakage of the battery and even an explosion. Furthermore, the cost in time and money of replacing damaged batteries situated deep within a wellbore can be significant because doing so requires removing the entire BHA to retrieve the battery and replace it.

SUMMARY OF THE INVENTION

It would be advantageous to have a large industrial power source for downhole tools that can withstand extended shocks and vibrations associated with harsh subsurface operating environments, while providing continuous power to operate the tool.

According to a first broad aspect of the present invention, there is provided a coil battery engagement member comprising:

an inner face; and at least one protuberance protruding from the inner face and configured to engage a battery coil.

In some exemplary embodiments of the first aspect, the at least one protuberance comprises a barb, a prong or a raised rib (which raised rib may comprise a sharp inner edge or a rounded inner edge). At least one of the inner face and the at least one protuberance may be protected with an anticorrosive coating. The member may further comprise at least one feed-through aperture, which aperture may be filled with an electrical insulator. The engagement member may be injection molded, the at least one protuberance may comprise an electrical insulator, and the at least one protuberance may be chemically inert.

According to a second broad aspect of the present invention, there is provided a battery cell internals securing member comprising:

a generally cylindrical sleeve comprising an inner face; and at least one protuberance on the inner face configured to engage the battery cell internals.

In some exemplary embodiments of the second aspect, the at least one protuberance comprises a raised rib running lengthwise on the inner face, which raised rib may comprise a sharp inner edge or a rounded inner edge. The at least one protuberance may comprise an electrical insulator, and the inner face may comprise a barrier coating. At least one of the inner face and the at least one protuberance may be protected with an anticorrosive coating. The sleeve and the at least one protuberance may be injection molded. The at least one protuberance is preferably chemically inert.

According to a third broad aspect of the present invention, there is provided a battery cell internals retention assembly comprising:

a battery cell internals securing sleeve comprising:
a generally cylindrical sleeve comprising a sleeve inner face; and
at least one sleeve protuberance on the sleeve inner face configured to engage battery cell internals; and
at least one cap disposed adjacent an end of the sleeve, the cap comprising:
an outer periphery and a cap inner face; and
at least one cap protuberance protruding from the cap inner face configured to engage the battery cell internals.

In some exemplary embodiments of the third aspect, the sleeve comprises two open ends and one of the at least one cap is disposed adjacent each open end. The outer periphery of the at least one cap may be sealed by a seal to the sleeve, which seal may be a hermetic seal preferably achieved by one of plastic welding and e-beam welding, and may further comprise a gasket disposed between the sleeve body and the outer periphery of the at least one cap.

The at least one cap and the sleeve may further comprise a keying feature to retain the at least one cap in fixed relation to the sleeve. The keying feature may comprise at least one tab on the sleeve and at least one corresponding notch on the outer periphery of the cap.

In some embodiments, each of the at least one cap protuberance and the at least one sleeve protuberance comprises a barb, a prong or a raised rib (which raised rib may comprise a sharp inner edge or a rounded inner edge).

At least one of the sleeve inner face, the cap inner face, the at least one cap protuberance, and the at least one sleeve protuberance may be protected with an anticorrosive coating.

The assembly may further comprise at least one feed-through aperture in the cap, and in some embodiments at least one of the at least one feed-through aperture is filled with an electrical insulator.

At least one of the cap and the sleeve may be injection molded. At least one of the at least one cap protuberance and the at least one sleeve protuberance may comprise an electrical insulator. At least one of the at least one cap protuberance and the at least one sleeve protuberance may be chemically inert. The cap and the sleeve may be composed of material having zero or low moisture absorption, such as polychlorotrifluoroethylene.

According to a fourth broad aspect of the present invention, there is provided a power supply comprising a battery cell adapted for supplying power to a downhole tool, the power supply comprising:

a battery cell internals securing sleeve, the battery cell internals comprising a spiral-wound group of electrodes comprising at least one alternation of negative electrode, separator, and positive electrode, the battery cell internals securing sleeve comprising:
a sleeve comprising a sleeve inner face; and
at least one sleeve protuberance on the sleeve inner face configured to engage the battery cell internals;
at least one cap disposed adjacent an open end of the sleeve and sealed by a seal thereto comprising:
an outer periphery and a cap inner face facing the battery cell internals;
a current outlet terminal; and
at least one cap protuberance protruding from the inner face, configured to engage the battery cell internals; and
an electrolyte disposed within the battery cell.

In some exemplary embodiments of the fourth aspect, the sleeve comprises two open ends and one of the at least one cap is disposed adjacent each open end. The seal may be a hermetic seal, which may be achieved by one of plastic welding and e-beam welding. A gasket may be disposed between the sleeve and the outer periphery of the at least one cap.

The at least one cap and the sleeve may comprise a keying feature to retain the at least one cap in fixed relation to the sleeve. Such a keying feature may comprise at least one tab on the sleeve and at least one corresponding notch on the outer periphery of the cap.

At least one of the at least one cap protuberance and the at least one sleeve protuberance may comprise a barb, a prong, or a raised rib (which raised rib may comprise a sharp inner edge or a rounded inner edge).

At least one of the sleeve inner face, the cap inner face, the at least one cap protuberance, and the at least one sleeve protuberance may be protected with an anticorrosive coating.

The power supply may further comprise at least one feed-through aperture in the cap, and in some cases at least one of the at least one feed-through aperture is filled with an electrical insulator. At least one of the cap and the sleeve may be injection molded. At least one of the at least one cap protuberance and the at least one sleeve protuberance may comprise an electrical insulator. At least one of the at least one cap protuberance and the at least one sleeve protuberance may be chemically inert. The cap and the sleeve may be composed of material having zero or low moisture absorption, such as polychlorotrifluoroethylene.

In some embodiments, the length of the sleeve is shorter than that of the battery cell internals when the battery cell internals are in a relaxed position. The inner diameter of the sleeve may be smaller than the outer diameter of the battery cell internals when the battery cell internals are in a relaxed position.

The cap may further comprise an electrical connection means to provide an electrical link between the cap and the battery cell internals.

Exemplary embodiments may further comprise a wrapper enclosing the battery cell internals.

The cap may be locked to the sleeve, and in some cases the sleeve comprises at least one tab and the cap comprises at least one corresponding recess that locks the cap and the sleeve in fixed relation.

According to a fifth broad aspect of the present invention, there is provided a method of manufacturing a cylindrical battery cell comprising the steps of:

providing a battery cell internals securing sleeve comprising:
- a sleeve comprising a sleeve inner face; and
- at least one sleeve protuberance on the sleeve inner face configured to engage battery cell internals;

providing the battery cell internals comprising a spiral-wound group of electrodes comprising at least one alternation of negative electrode, separator, and positive electrode, and inserting the battery cell internals into the sleeve;

providing at least one cap comprising:
- an outer periphery and a cap inner face facing the battery cell internals;
- a current outlet terminal; and
- at least one cap protuberance protruding from the inner face and configured to engage the battery cell internals;

sealing the at least one cap adjacent an open end of the sleeve; and filling the cell with an electrolyte.

In some exemplary embodiments of the fifth aspect, the sleeve comprises two open ends and further comprising the step of sealing one of the at least one cap adjacent each open end. Exemplary methods may further comprise the step of positioning a gasket between the sleeve and the at least one cap.

Exemplary methods may further comprise engaging a keying feature to retain the at least one cap in fixed relation to the sleeve. Such a keying feature may comprise at least one tab on the sleeve and at least one corresponding notch on the outer periphery of the cap and wherein the method further comprises the step of engaging the at least one tab with the at least one notch.

Some exemplary methods further comprise the step of applying an anticorrosive coating to at least one of the sleeve inner face, the cap inner face, the at least one cap protuberance, and the at least one sleeve protuberance. Exemplary methods may further comprise the step of injection molding at least one of the cap and the sleeve.

In some exemplary methods, the length of the sleeve is shorter than that of the battery cell internals when the battery cell internals are in a relaxed position and wherein the step of sealing the cap to the sleeve comprises putting the battery cell internals under compression to fit the battery cell internals within the length of the sleeve.

In some exemplary methods, the inner diameter of the sleeve is smaller than the outer diameter of the battery cell internals when the battery cell internals are in a relaxed position and wherein the step of inserting the battery cell internals into the sleeve comprises putting the battery cell internals under compression to fit within the sleeve.

Some exemplary methods may further comprise the step of applying a wrapper enclosing the battery cell internals.

According to a sixth broad aspect of the present invention, there is provided a pouch cell battery assembly comprising:

at least one pouch cell having an outer periphery, the outer periphery provided with at least one recess; and a sleeve for receiving and retaining the at least one pouch cell, the sleeve provided with at least one sleeve protuberance on an inner surface thereof corresponding to and configured for engagement with the at least one recess.

In some exemplary embodiments of the sixth aspect, the assembly further comprises sleeve end caps, at least one of the sleeve end caps provided with at least one cap protuberance configured to engage with the at least one pouch cell. Exemplary assemblies may further comprise a casing for receiving and retaining the sleeve when the sleeve retains the at least one pouch cell. Exemplary assemblies may further comprise an alignment recess on the outer periphery and a corresponding alignment protuberance on the inner surface of the sleeve.

The present invention may in some embodiments allow for a rugged cell and battery packaging that meets performance and reliability requirements for MWD tools subjected to extended shocks and vibration, while providing for increased safety by minimizing the risks of short-circuiting the battery.

Detailed descriptions of exemplary embodiments of the present invention are given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

DESCRIPTION OF THE DRAWINGS

While the invention is claimed in the concluding portions hereof, exemplary embodiments are provided in the accompanying detailed description which may be best understood in conjunction with the accompanying diagrams where like parts in each of the several diagrams are labeled with like numbers, and where:

FIG. 1b is a sectional view of the assembled prior art design of FIG. 1a;

FIG. 3b is a sectional view of the assembled embodiment of FIG. 3a;

Exemplary embodiments of the present invention will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise forms of any exemplary embodiment. Accordingly, the description and drawings are to be regarded in an illustrative, rather than a restrictive, sense.

A battery or cell pack for use as a power supply for a downhole instrument is provided. The downhole battery or cell pack can be industrial-sized for use in downhole applications, and can be specifically engineered for use in high temperature, high shock, and high vibration applications where performance is critical.

Figure 1A:
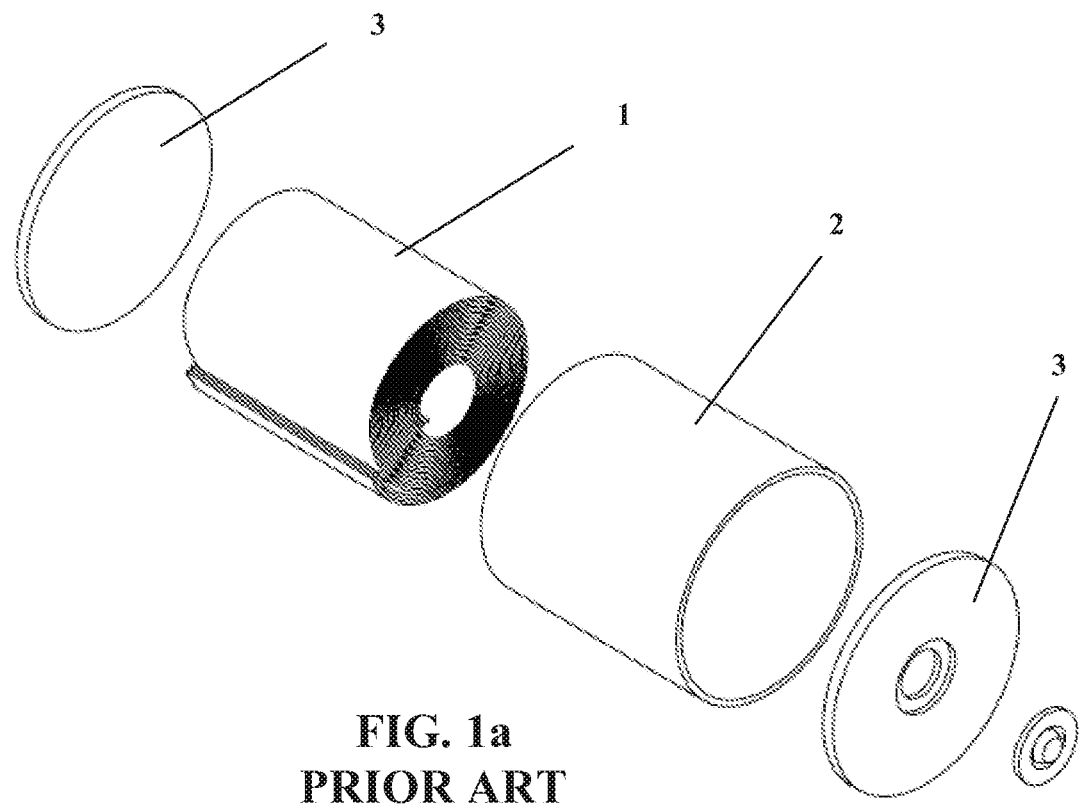
FIG. 1a is an exploded perspective view of a prior art high rate battery design with coiled storage internals.
Figure 1B:
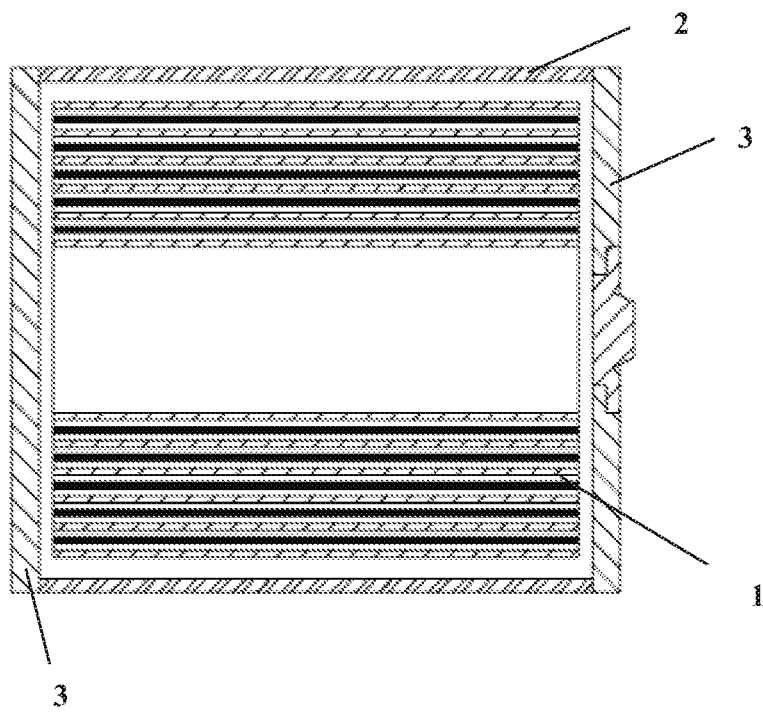

FIGS. 1a and 1b illustrate a prior art battery cell for use in certain downhole tools. The cell comprises a casing 2 being provided with ends 3. The casing 2 is designed and configured to house a battery coil 1, which is illustrated as a high rate jelly roll storage cell. The coil 1 is inserted into the casing 2, and ends 3 are secured to the opposed ends of the casing 2, with the final product shown in section in FIG. 1b. As can be seen, the coil 1 is not secured within the casing 2 interior.

Figure 2A:
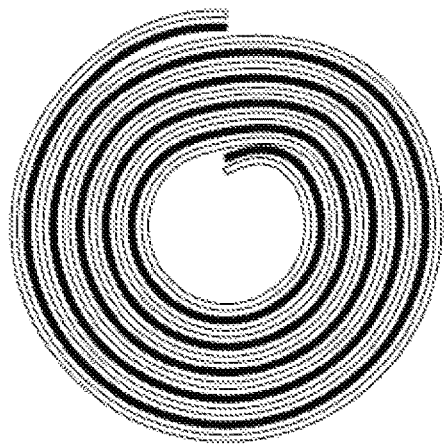
FIGS. 2a to 2c are sectional views of prior art battery internals.
Figure 2B:
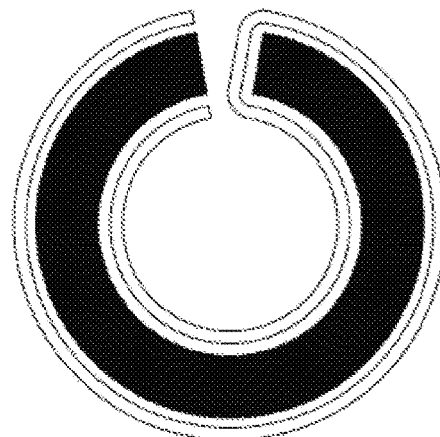
Figure 2C:
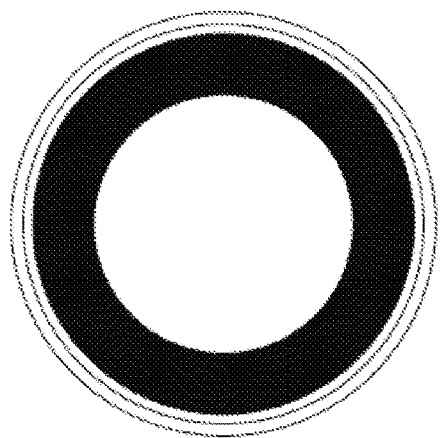

FIGS. 2a to 2c illustrate conventional battery internals, namely a high rate construction, a moderate rate construction, and a bobbin construction.

Figure 3A:
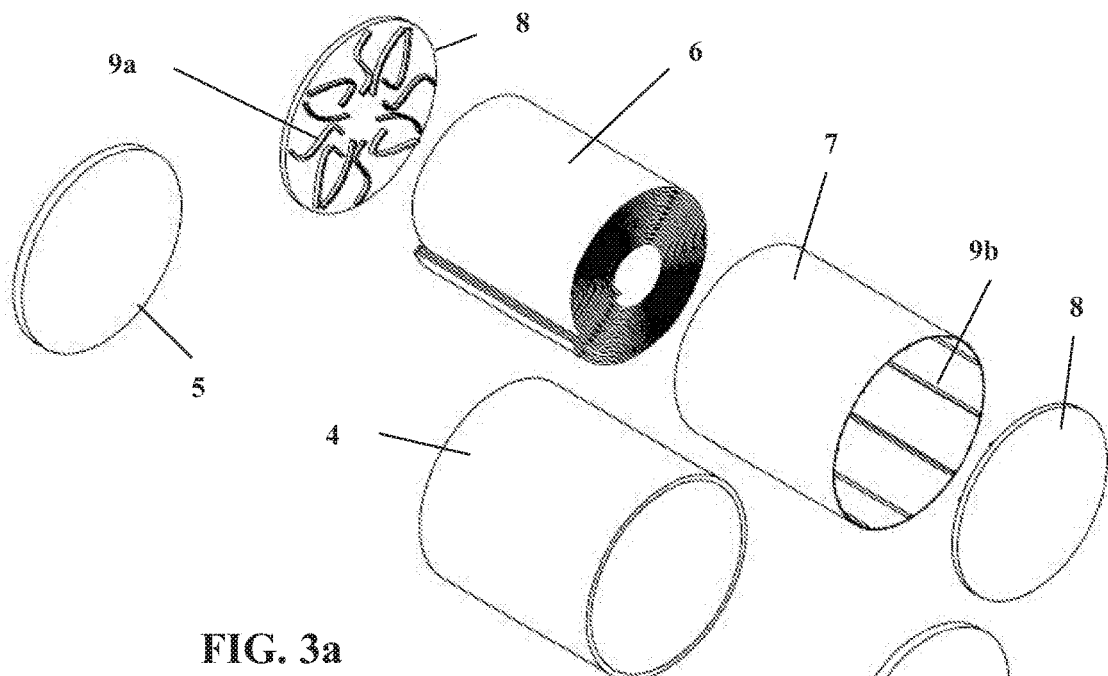
FIG. 3a is an exploded perspective view of a first exemplary battery cell design according to the present invention.
Figure 3B:
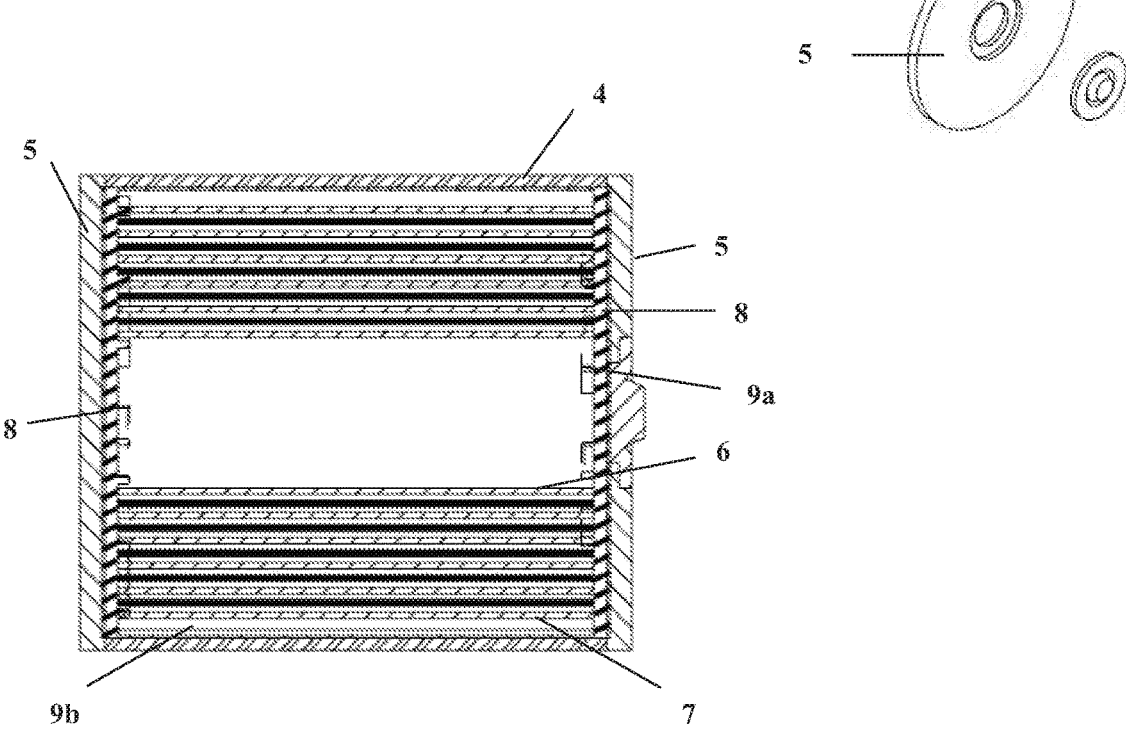

Turning now to FIGS. 3a and 3b, a first exemplary embodiment of the present invention is illustrated. As with the prior art design of FIGS. 1a and 1b, the battery internals are housed within a casing 4 which is sealed with two end caps 5. The battery internals comprise a conventional coil 6. However, unlike the prior art design which retains the coil within cylindrical casing walls having smooth surfaces, the exemplary embodiment of FIGS. 3a and 3b retain the coil 6 within a sleeve 7 having end caps 8, the sleeve 7 configured to be disposed within the casing 4. Furthermore, the sleeve 7 is provided with axial ribs or grips or protuberances 9b for reducing the risk or extent of rotational movement of the coil 6 during stick/slip events, thus reducing any unrolling of the coil 6, while the end caps 8 are configured to press against the axial ends of the coil 6 and with ribs or grips or protuberances 9a accordingly again reduce the risk or extent of unrolling of the coil 6. FIG. 3b illustrates how, when assembled, the ribs or protuberances 9a and 9b press into the coil 6 and reduce the risk or extent of coil 6 unrolling or uncoiling within the casing 4.

FIGS. 4a to 7b illustrate four different exemplary embodiments of battery cell internals securing caps (also referred to as caps or end caps herein) 10, 20, 30, 40 according to the present invention. The caps 10, 20, 30, 40 each comprise a generally circular body 11, 21, 31, 41 having an outer periphery 12, 22, 32, 42, an inner or inwardly-directed face 13, 23, 33, 43, and an outer or outwardly-directed face 14, 24, 34, 44. A plurality of cap grips or protuberances 15, 25, 35, 45 protrude from each inner face 13, 23, 33, 43, again to engage or grip the coil of the battery internals.

The bodies 11, 21, 31, 41 and cap grips 15, 25, 35, 45 are preferably composed of non-conductive material and may be of unitary construction, and may also be injection molded. The bodies 11, 21, 31, 41 and the cap grips 15, 25, 35, 45 may be made out any suitable durable material, typically with a high melting point and a high corrosion resistance, such as for one non-limiting example aluminum. The cap grips 15, 25, 35, 45 can be made out of materials that provide for reductions in electrochemical or other types of reactions between the energy storage cell and the caps 10, 20, 30, 40 or the rest of the cell casing. For example, the grips 15, 25, 35, 45 can comprise an electrical insulator and can be chemically inert to resist electrical and chemical interactions between the storage cell and the cap 10, 20, 30, 40 or the rest of the cell casing. In some embodiments, the grips 15, 25, 35, 45 could be made out of polyether ether ketone (PEEK), polyphenylene sulfide (PPS), polytetrafluoroethylene (PTFE), perfluoroalkoxy (PFA), fluorinated ethylene propylene (FEP), or ethylene tetrafluoroethylene (ETFE). In other embodiments, the grips 15, 25, 35, 45 could be made out of a ceramic material.

Figure 4A:
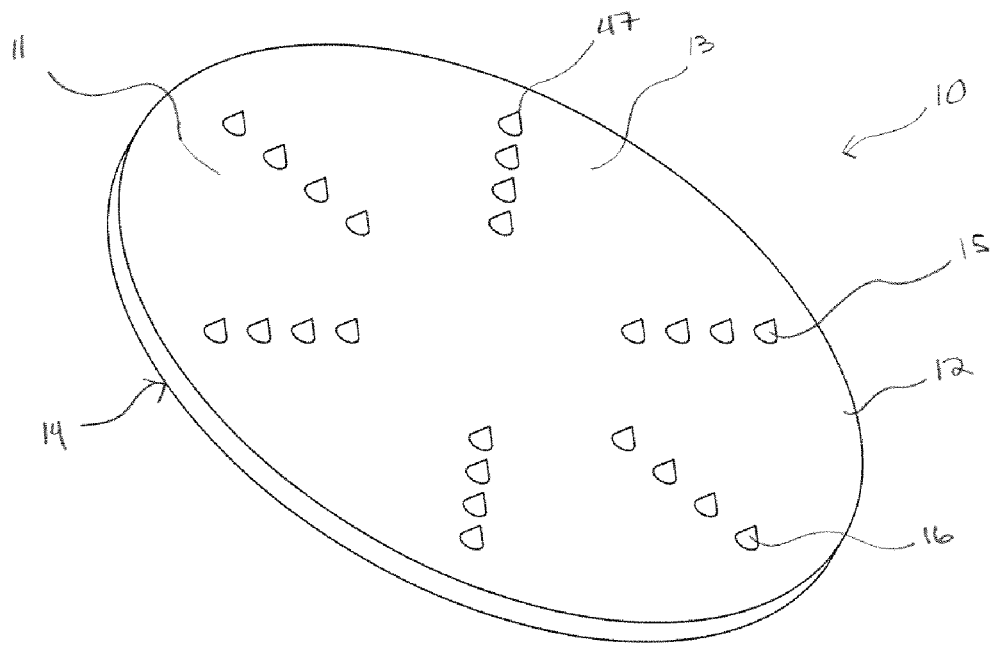
FIGS. 4a and 4b are perspective and bottom plan views of a first battery cell cap according to the present invention.
Figure 4B:
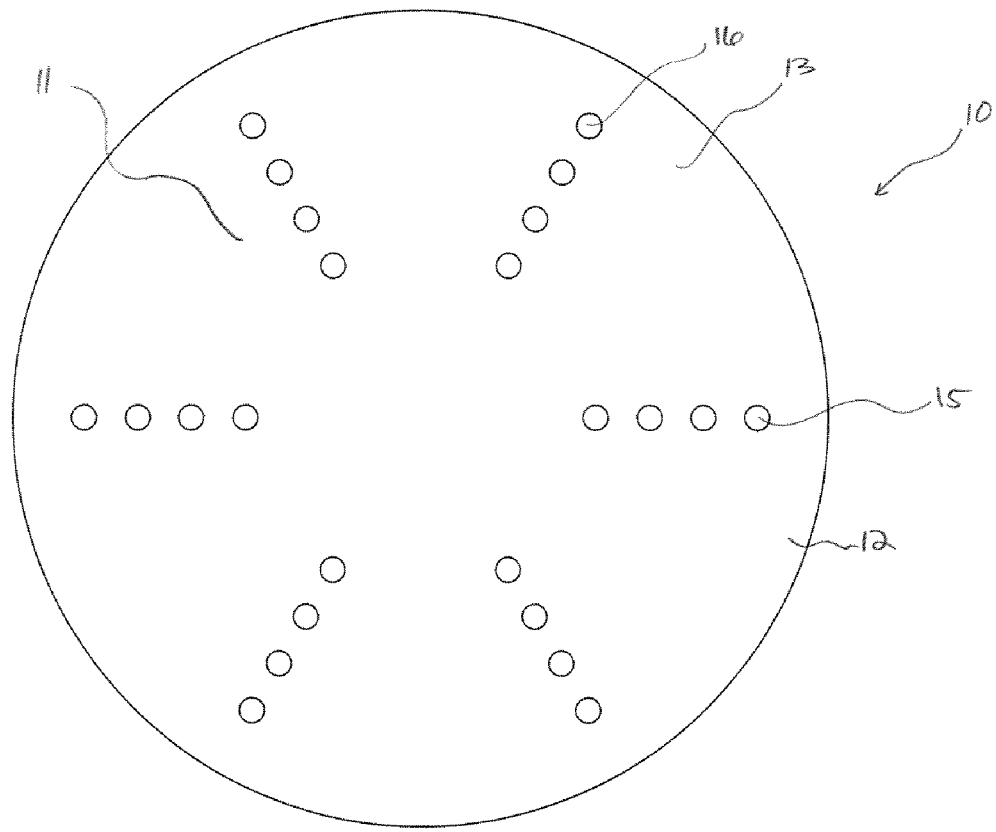
Figure 5A:
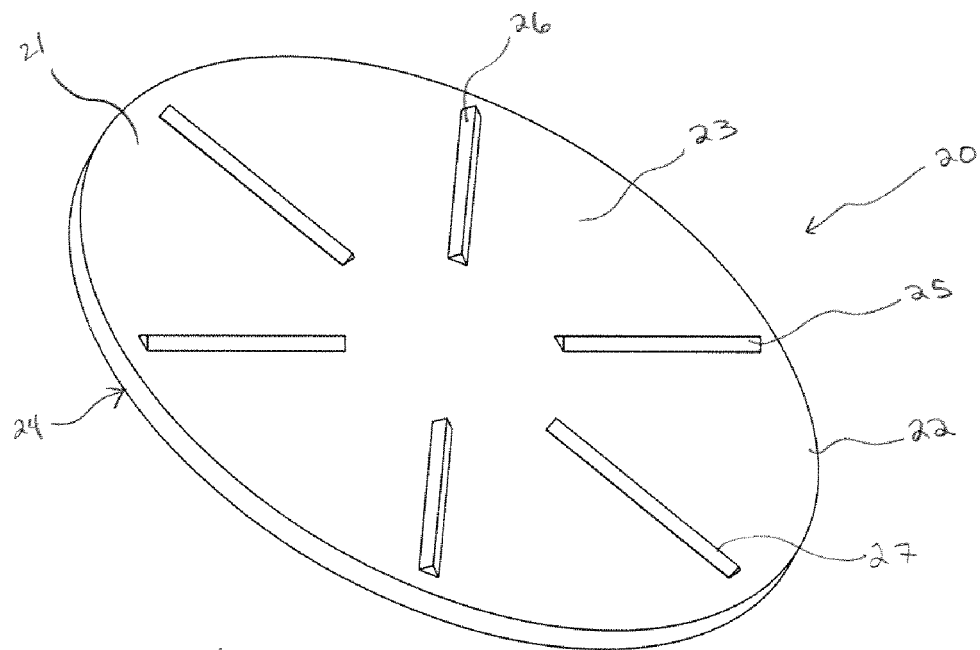
FIGS. 5a and 5b are perspective and bottom plan views of a second battery cell cap according to the present invention.
Figure 5B:
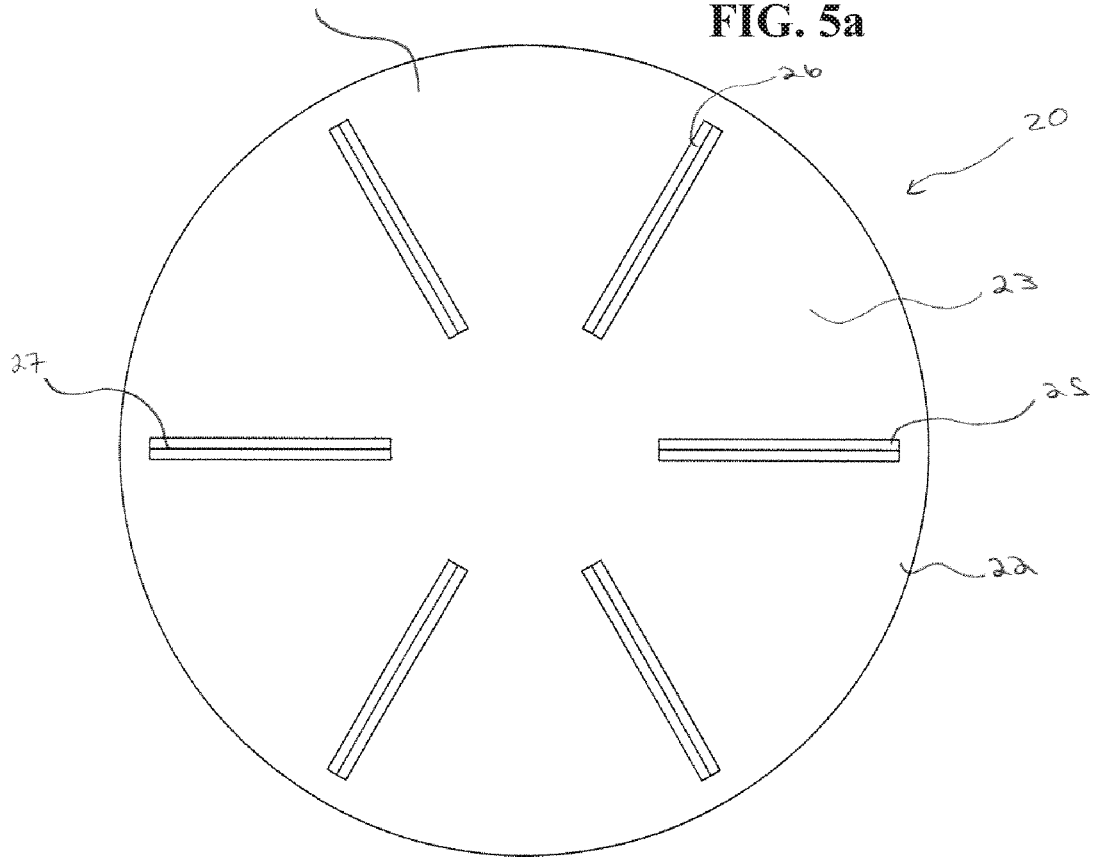
Figure 6A:
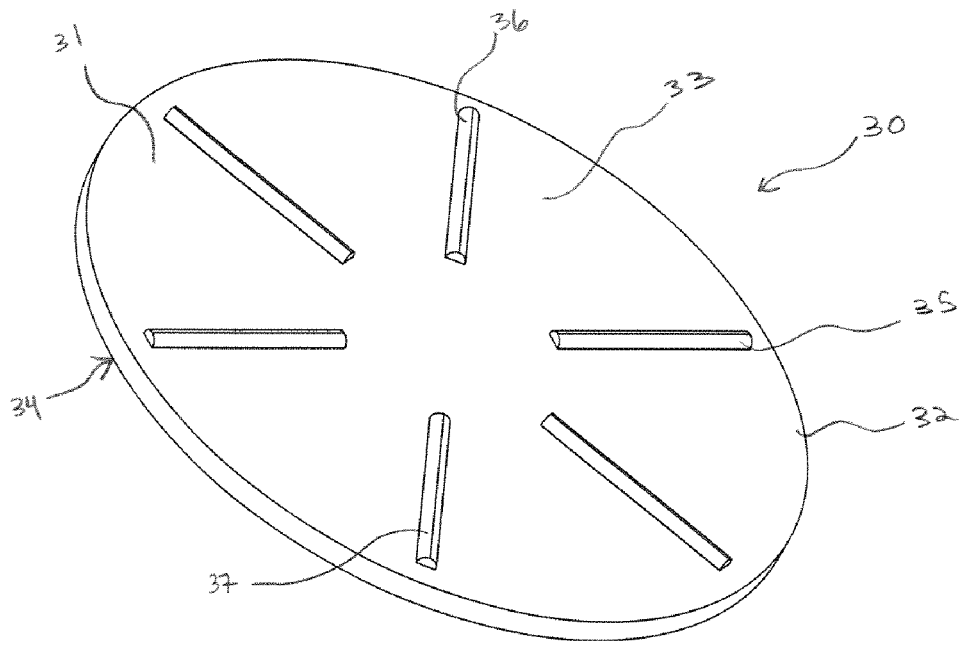
FIGS. 6a and 6b are perspective and bottom plan views of a third battery cell cap according to the present invention.
Figure 6B:
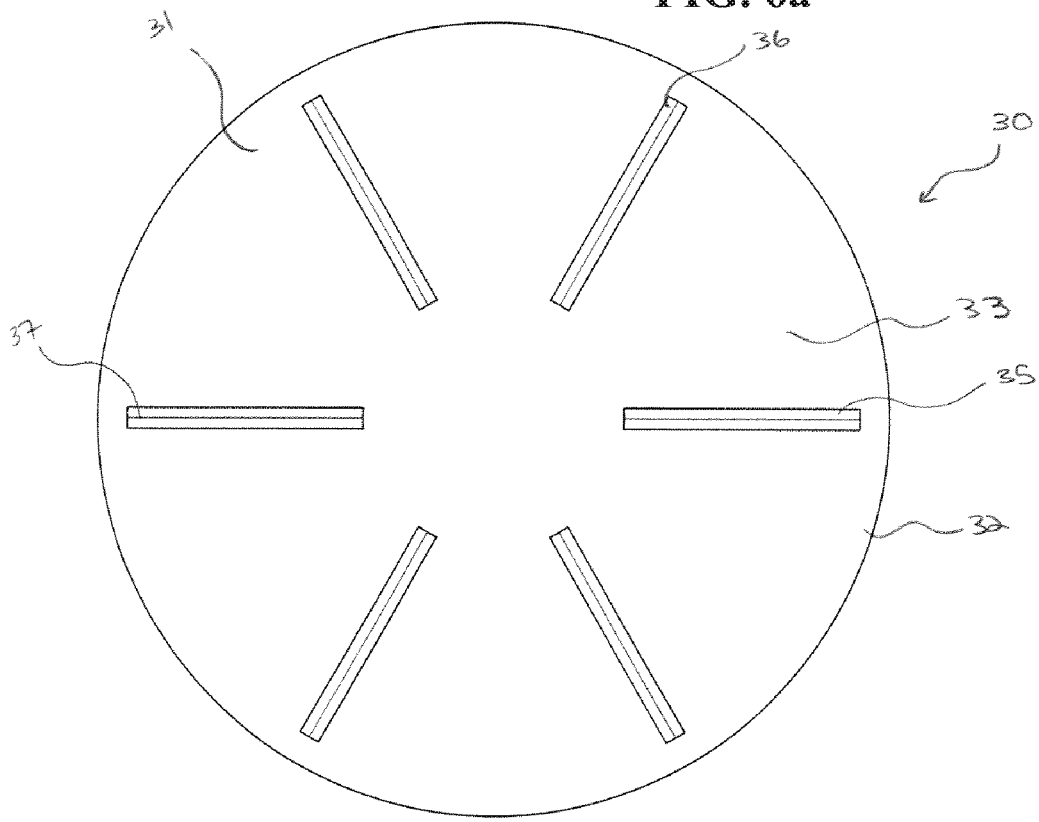
Figure 7A:
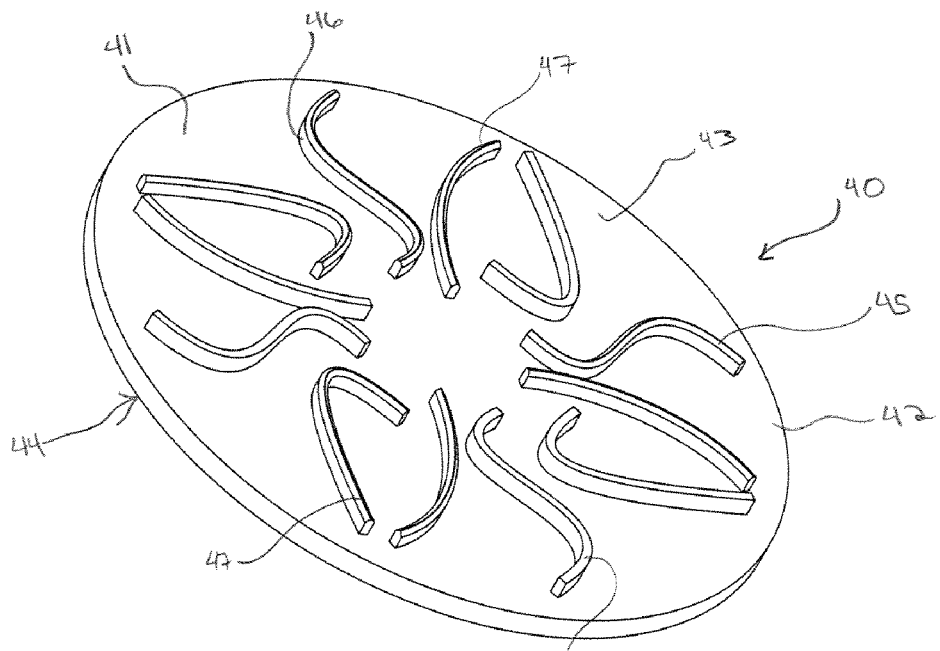
FIGS. 7a and 7b are perspective and bottom plan views of a fourth battery cell cap according to the present invention.
Figure 7B:
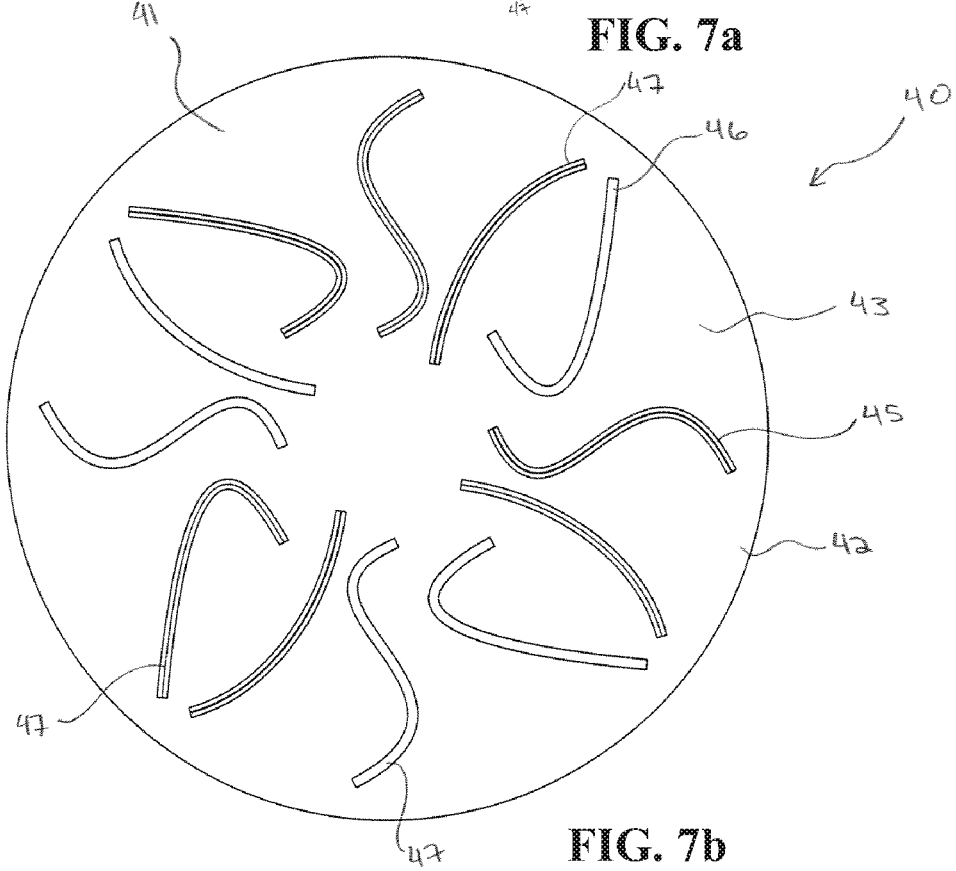
Figure 8A:
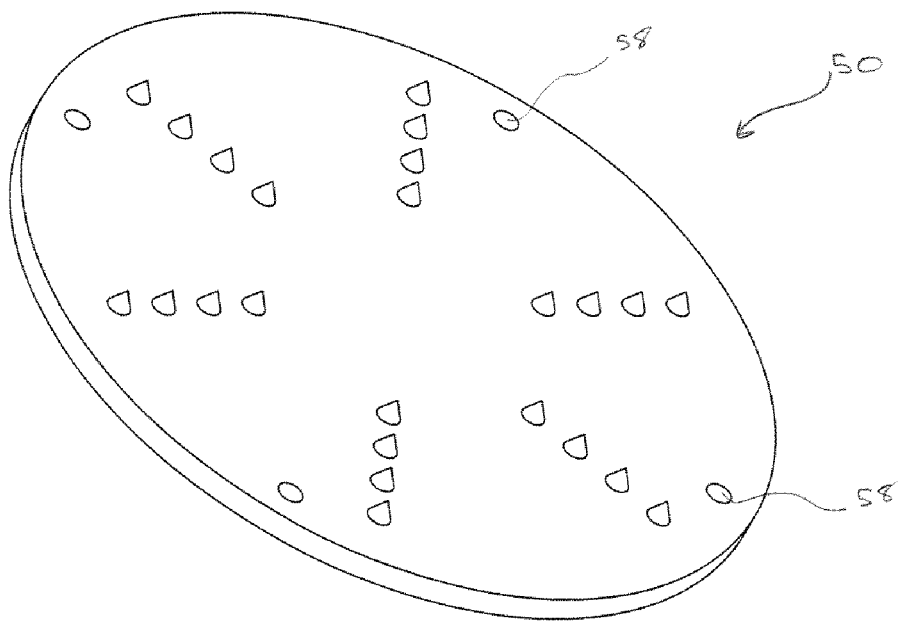
FIGS. 8a and 8b are perspective and bottom plan views of a fifth battery cell cap according to the present invention.
Figure 8B:
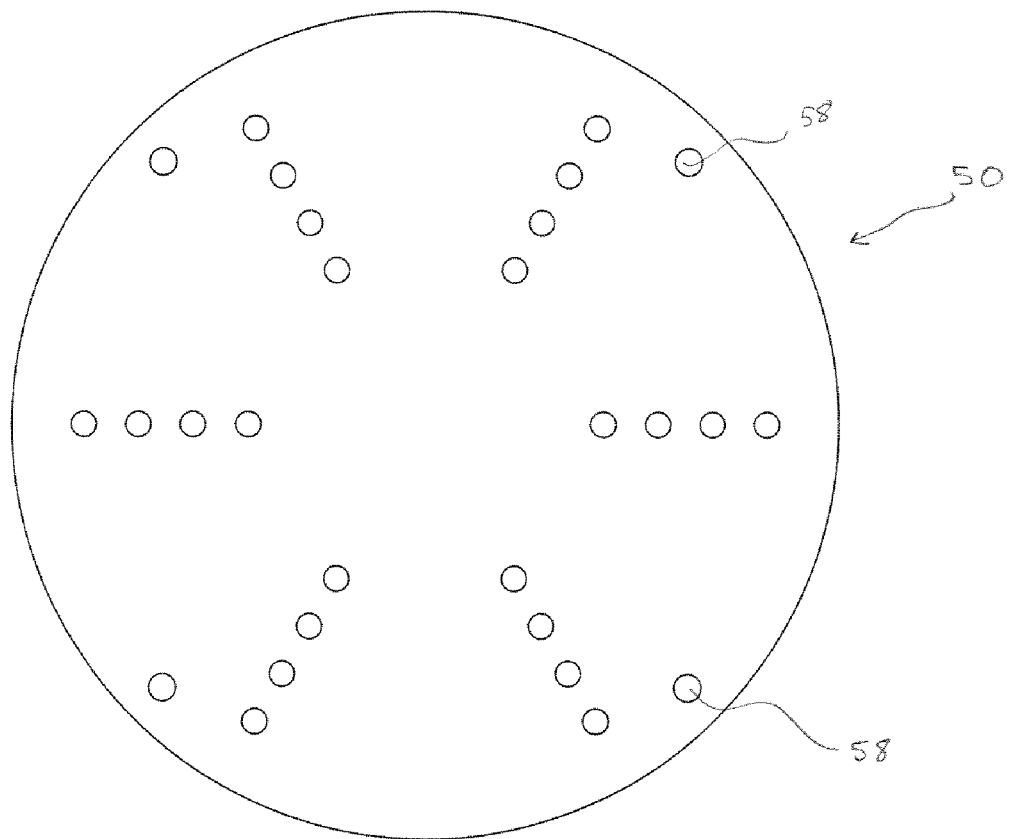
Figure 9A:
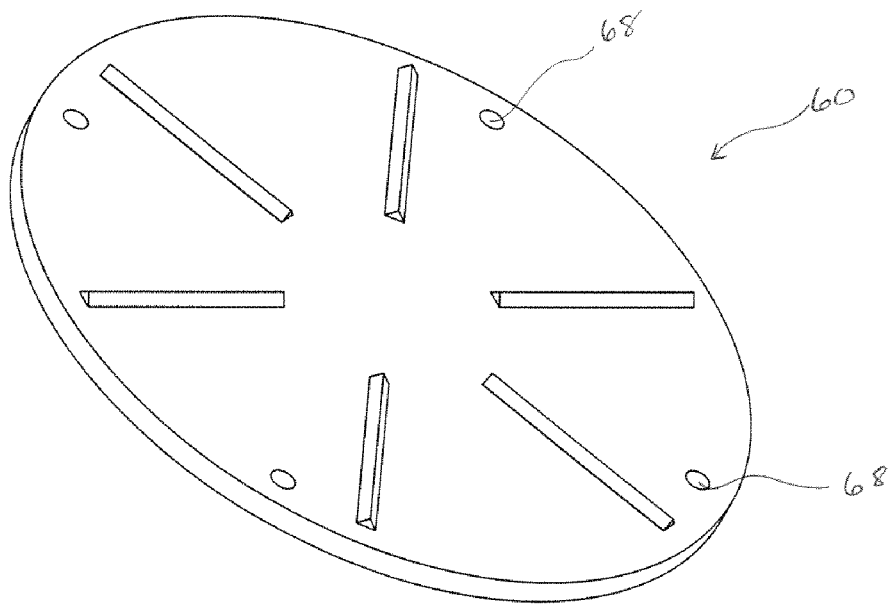
FIGS. 9a and 9b are perspective and bottom plan views of a sixth battery cell cap according to the present invention.
Figure 9B:
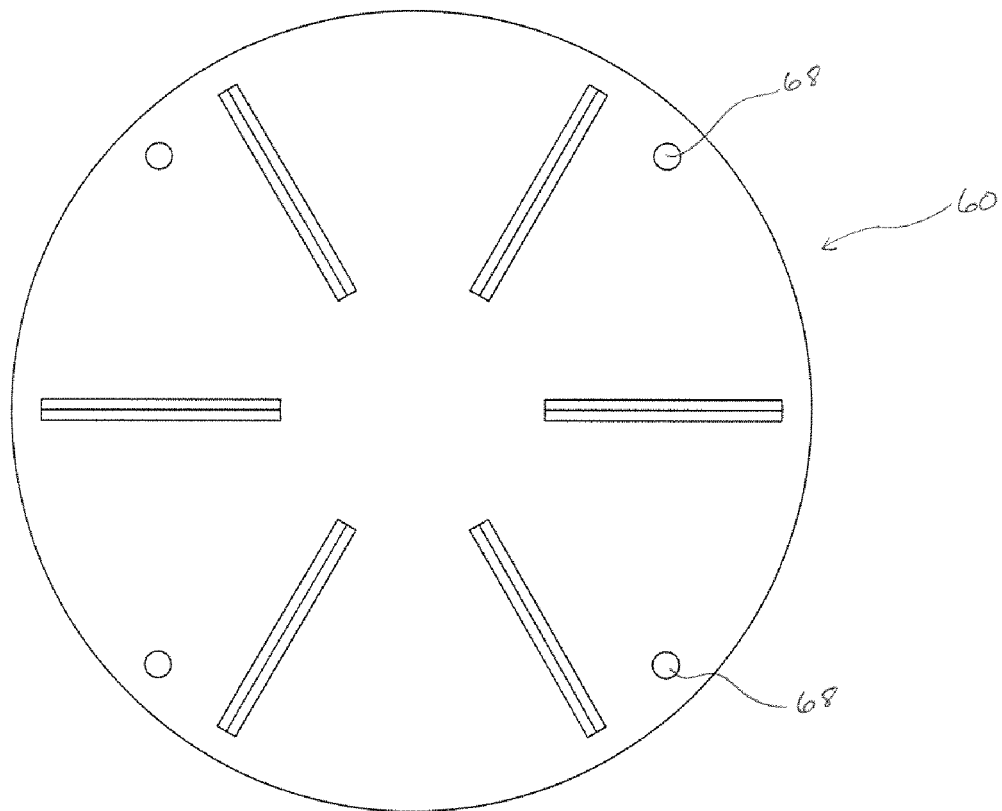

As indicated above, the cap grips 15, 25, 35, 45 could be adapted to grip the ends of a coil and to hold the coil in place within a battery casing without allowing the coil to substantially unwind while being subjected to stick/slip shocks and vibration. The cap grips 15, 25, 35, 45 could be fitted with various protuberances such as a key or a barb 16 as shown in FIGS. 4a and 4b. The cap grips 25, 35 could be raised radial ribs 26, 36 as shown in FIGS. 5a, 5b, 6a, and 6b, rather than using sharp prongs or barbs for safety purposes, as raised ribs 26, 36 may not present the danger of harming people or equipment with sharp points or puncturing through the coil. As shown in FIGS. 7a and 7b, cap grips 45 could comprise raised ribs configured in a pattern. In some aspects the ribs 26, 36 could be distributed angularly about the center of the caps 20, 30 rather than being disposed at right angles to the outer diameter of the caps 20, 30, and in some aspects could be straight as shown in FIGS. 5a, 5b, 6a, and 6b, or curved as shown in FIGS. 7a and 7b. The raised ribs 26 could provide additional gripping functionality through a sharp edge 27 along the ribs 26, as shown in FIGS. 5a and 5b, which may allow the ribs 26 to catch the coil more easily, though in other aspects such as that shown in FIGS. 6a and 6b, the ribs 36 could have a rounded edge 37 to provide for increased surface area contact with the coil. As shown in the aspect of FIGS. 7a and 7b, the plurality of ribs 46 could have a combination of various configurations 47, including straight smooth edges, sharp edges, and rounded edges.

In some aspects, a single cap grip 15, 25, 35, 45 could provide sufficient friction between the cap 10, 20, 30, 40 and the coil, or only one or two cap grips 15, 25, 35, 45 could be provided on each cap 10, 20, 30, 40 so as the minimize the volume taken up by the grips 15, 25, 35, 45 that would otherwise be used for electrochemically active material within the battery casing. In other aspects there could be several cap grips 15, 25, 35, 45 to provide additional gripping means. For example, as shown in FIGS. 5a to 7b, the cap grips 25, 35, 45 comprise several ribs that can provide increased contact areas and grip between the coil and the cap 20, 30, 40. Other configurations of cap grips could include, for example, ribs comprising concentric raised circles from the center of the cap toward the outer diameter of the cap. Additional cap grips 15, 25, 35, 45 could be added to the outer periphery 12, 22, 32, 42 so as to ensure the cap 10, 20, 30, 40 is securely keyed to the coil.

The inner face 13, 23, 33, 43 of the cap 10, 20, 30, 40 and/or the grips 15, 25, 35, 45 can be protected with an anticorrosive material or coating that may be coated or plated onto the cap 10, 20, 30, 40 and/or the grips 15, 25, 35, 45. The anticorrosive material or coating could aid in minimizing corrosion, which could otherwise result in leakage and reduced shelf life of the battery. The grips 15, 25, 35, 45 could be made out of the anticorrosive material or could be coated or plated on to the grips 15, 25, 35, 45. The coating may be painted on or applied using techniques such as welding, cladding, or other adhesive techniques. It could also be plated onto the inner face 13, 23, 33, 43 of the cap 10, 20, 30, 40 and onto the ribs 26, 36, 46 or key 16 by electroplating or electroless plating. The anticorrosive material should be a non-conductive material.

In the embodiments shown in FIGS. 8a to 9b, the caps 50, 60 comprise apertures 58, 68 that can act as a feed-through that allows access to the stored energy of the storage cell when the casing encases the coil. One or more of the apertures 58, 68 could also be filled with an electrical insulator. It may also be possible to use the apertures 58, 68 as keying features in certain embodiments.

FIGS. 10a to 11b illustrate exemplary battery cell internals securing sleeves 70, 80. The sleeves 70, 80 each comprise a main body 71, 81 in the form of a cylinder having an inner face 72, 82 and that is open on at least one end 73, 83. The sleeves 70, 80 can be an injection molded outer diameter sleeve 70, 80 on the outer diameter of the coil in a battery cell. The body 71, 81 can be made out any suitable durable material, but it should be non-conductive or coated on the inner diameter so as to be electrically isolated, typically with a high melting point and a high corrosion resistance, such as for one non-limiting example aluminum. The body 71, 81 should be sized with an inner diameter and length to suit the coiled electrical energy storage element to be fit within the body 71, 81. In some embodiments, though, the body length of the sleeve 70, 80 could be shorter than that of the coil to be placed within it so as to put the coil under pressure during the closure of the body 71, 81 by end caps, such as the caps 10, 20, 30, 40, 50, or 60 of FIGS. 4a to 9b, on the at least one open end 73, 83 of the sleeve 70, 80.

Sleeves 70, 80 are illustrated as having sleeve grips 75, 85 on their inner faces 72, 82 that can grip the outer diameter of the coil to be placed within the sleeve 70, 80 so as to hold the coil in place within a battery casing without allowing the coil to substantially unwind while being subjected to stick/slip shocks and vibration. It should be noted that the sleeves and grips can be of unitary construction. In the embodiments shown in FIGS. 10a to 11b, the sleeve grips 75, 85 comprise raised ribs 76, 86 running along the length of the inner faces 72, 82 of the sleeves 70, 80. Sleeve grips 75, 85 can be made out of materials that provide for reductions in electrochemical or other types of reactions between the energy storage cell and the sleeves 70, 80 or the rest of the cell casing. For example, the sleeve grips 75, 85 can comprise an electrical insulator and can be chemically inert to resist electrical and chemical interactions between the coil and the sleeves 70, 80 or the rest of the cell casing. In some aspects, the sleeve grips 75, 85 could be made out of polyether ether ketone (PEEK), polyphenylene sulfide (PPS), polytetrafluoroethylene (PTFE), perfluoroalkoxy (PFA), fluorinated ethylene propylene (FEP), or ethylene tetrafluoroethylene (ETFE). In other embodiments, the sleeve grips 75, 85 could be made out of a ceramic material. In some embodiments, a barrier coating is provided on the inner faces 72, 82 of the sleeves 70, 80 to reduce electrochemical and other reactions between the sleeves 70, 80 and any electrolyte.

Figure 10A:
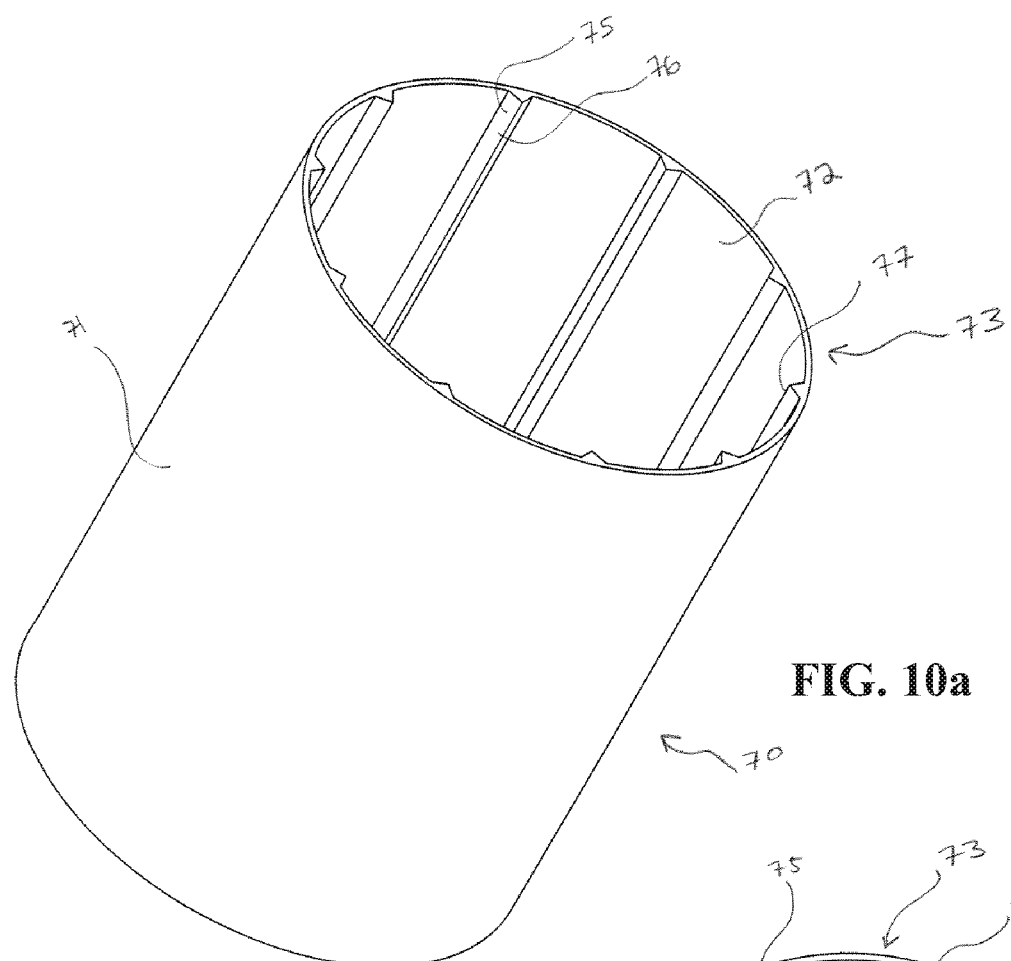
FIGS. 10a and 10b are perspective and bottom plan views of a first battery cell sleeve according to the present invention.
Figure 10B:
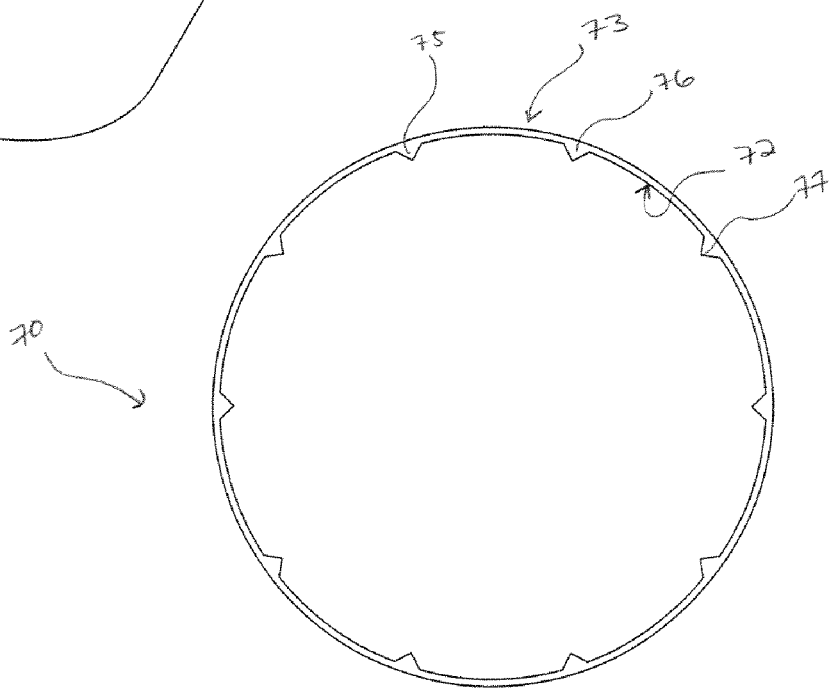
Figure 11A:
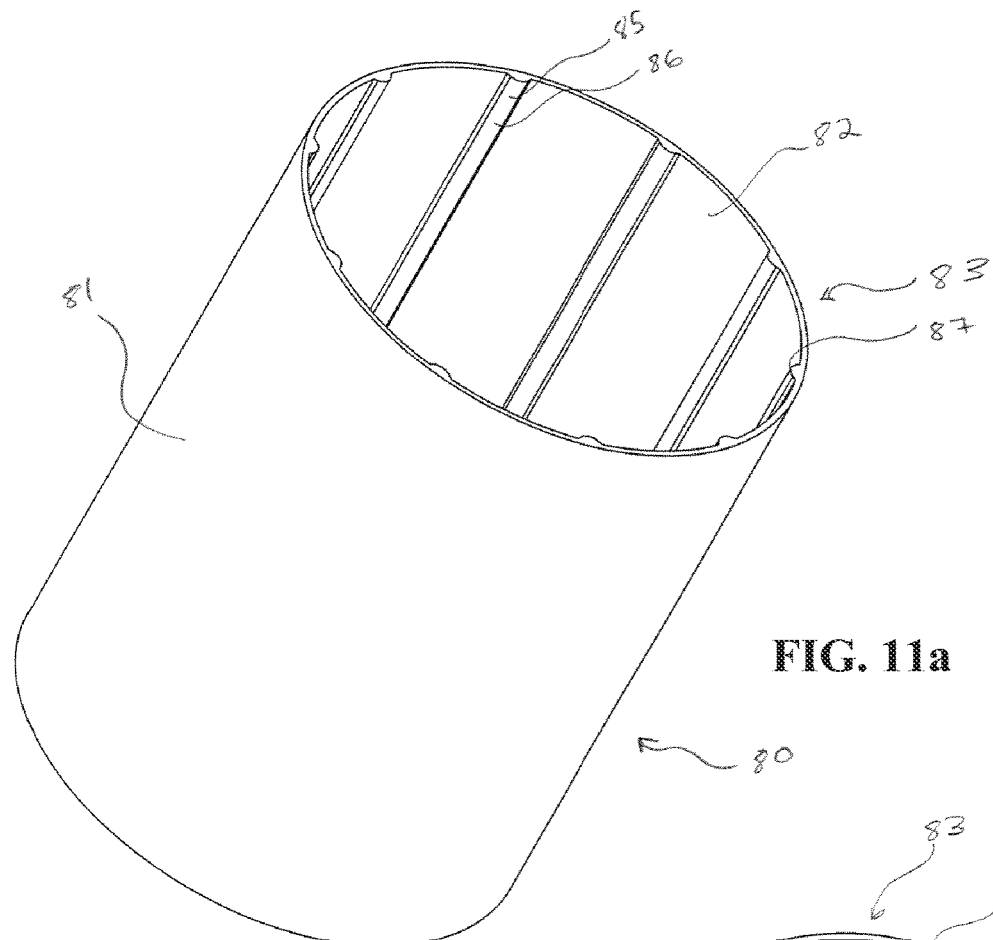
FIGS. 11a and 11b are perspective and bottom plan views of a second battery cell sleeve according to the present invention.
Figure 11B:
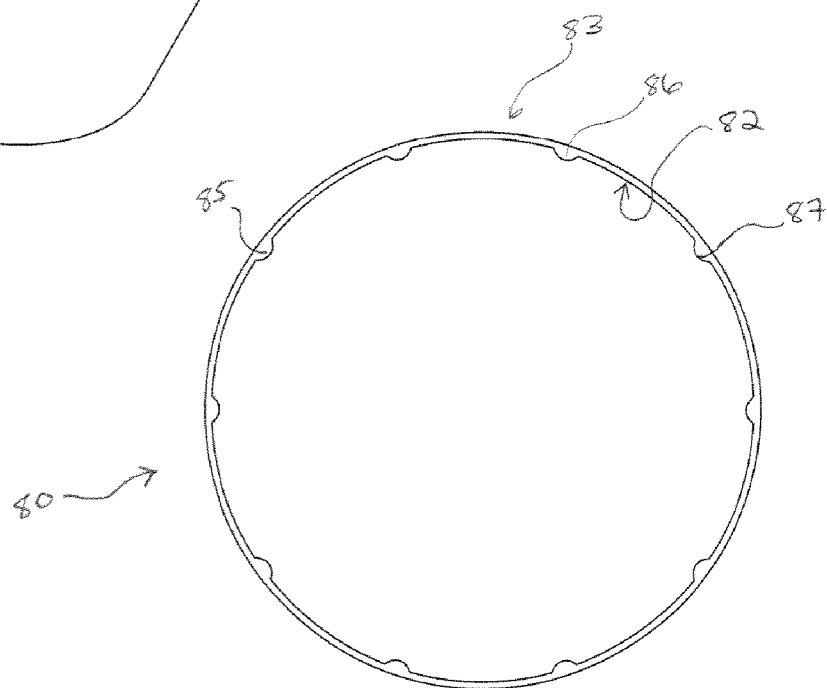
Figure 12A:
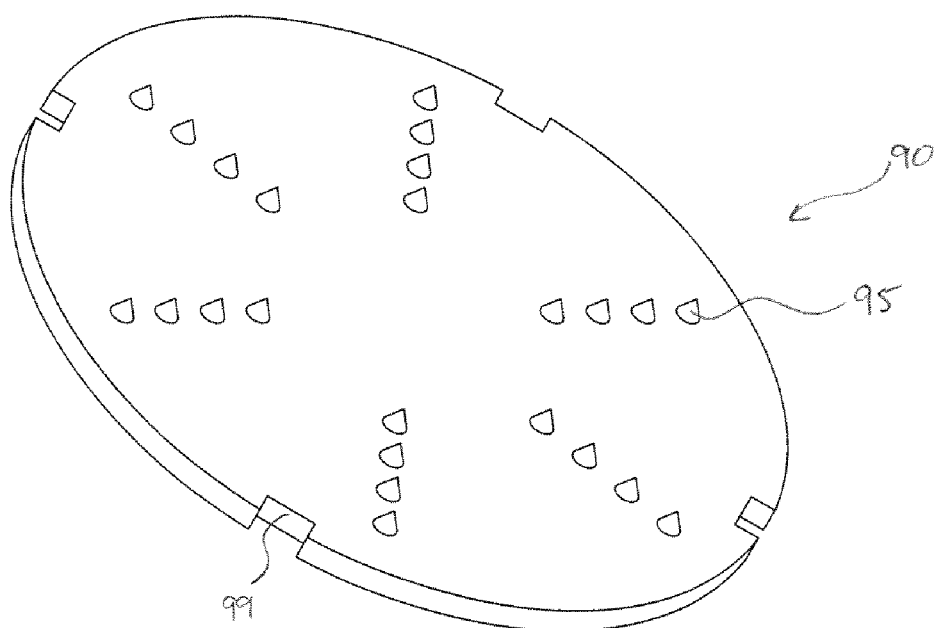
FIGS. 12a and 12b are perspective and bottom plan views of a seventh battery cell cap according to the present invention.
Figure 12B:
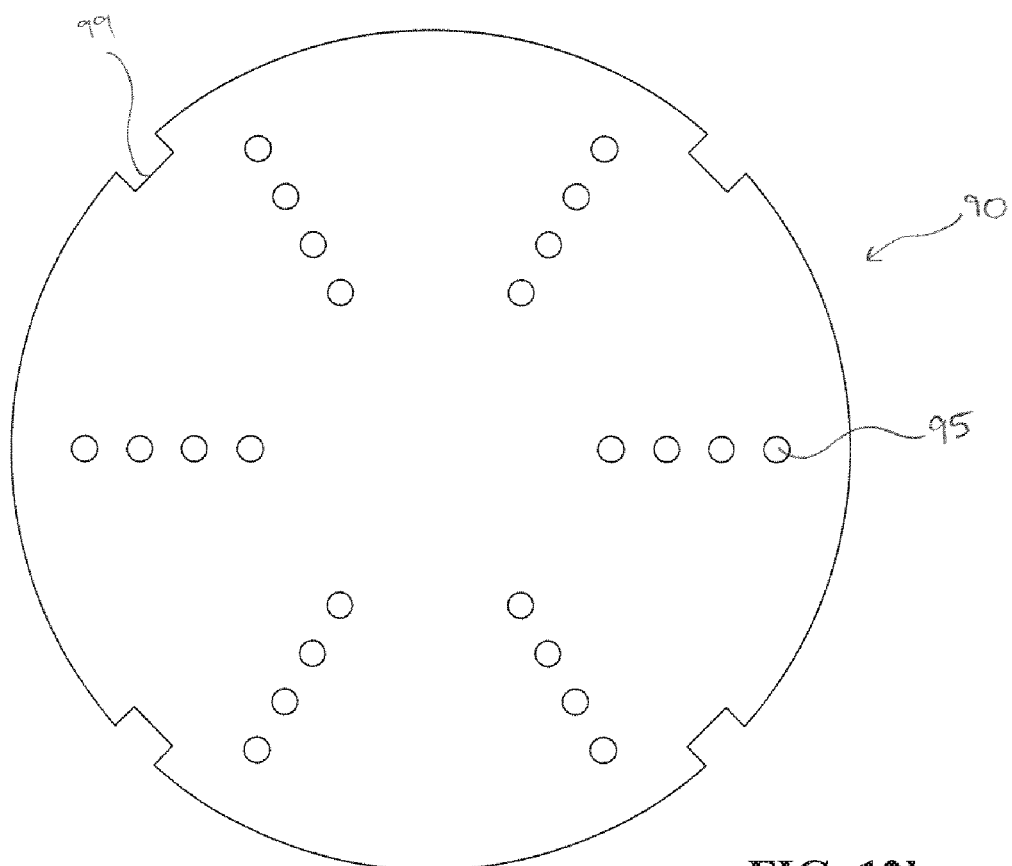
Figure 13A:
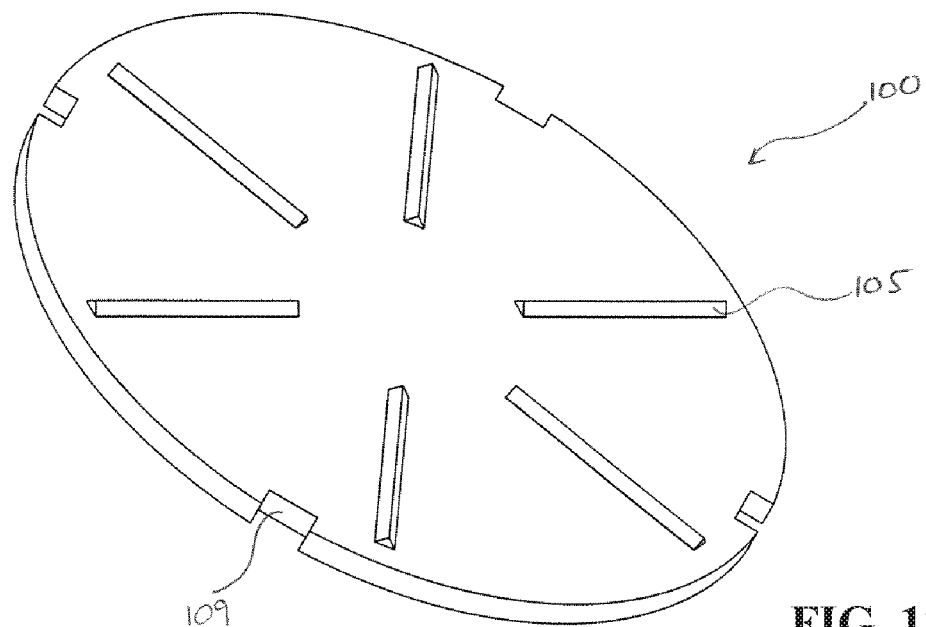
FIGS. 13a and 13b are perspective and bottom plan views of an eighth battery cell cap according to the present invention.
Figure 13B:
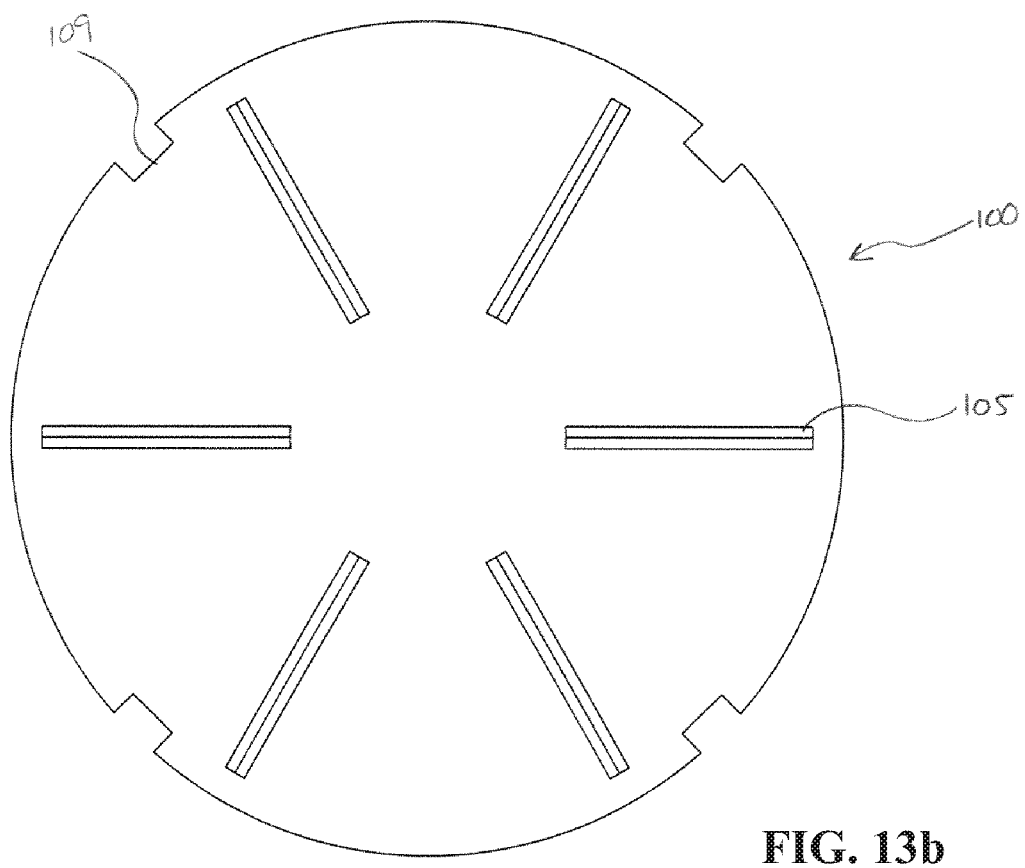
Figure 14A:
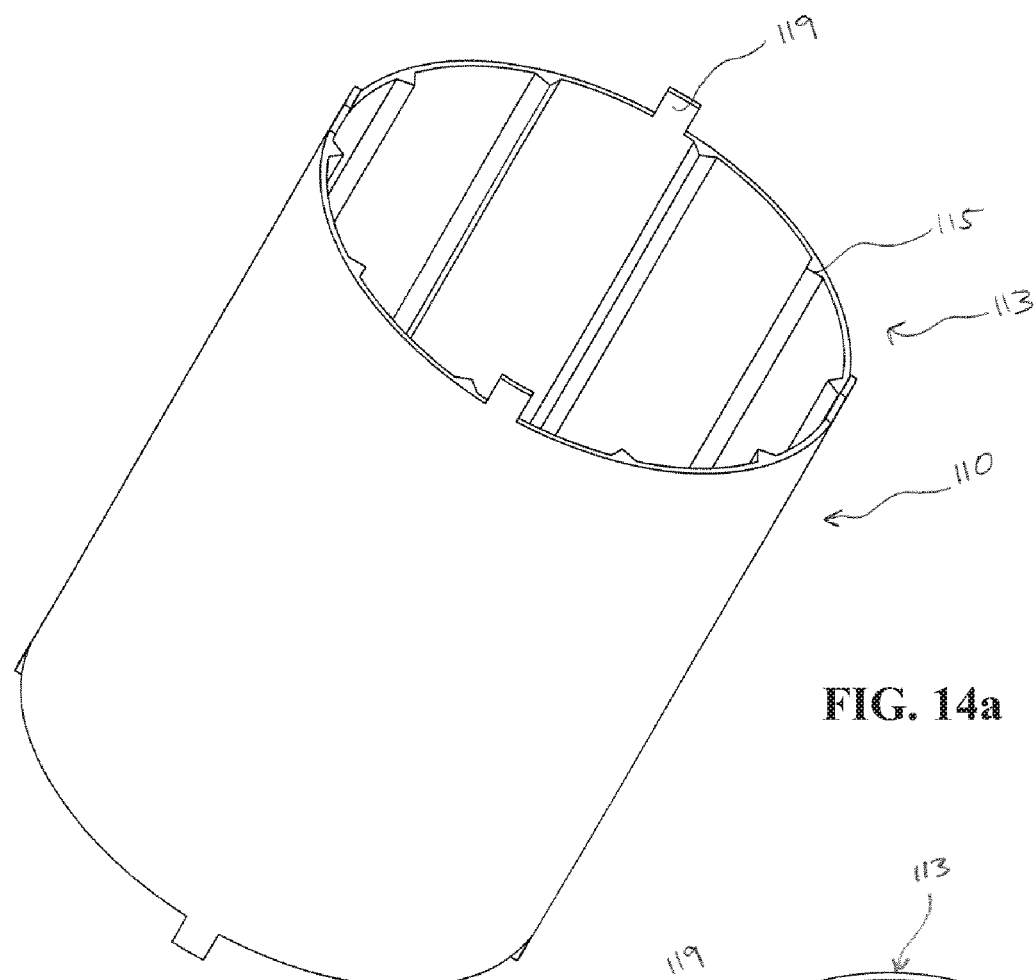
FIGS. 14a and 14b are perspective and bottom plan views of a third battery cell sleeve according to the present invention.
Figure 14B:
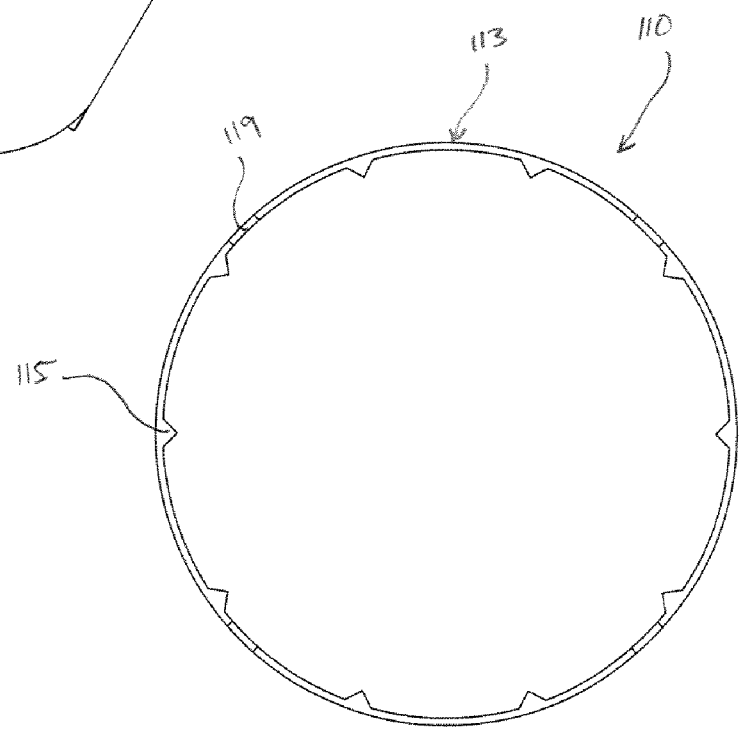
Figure 15A:
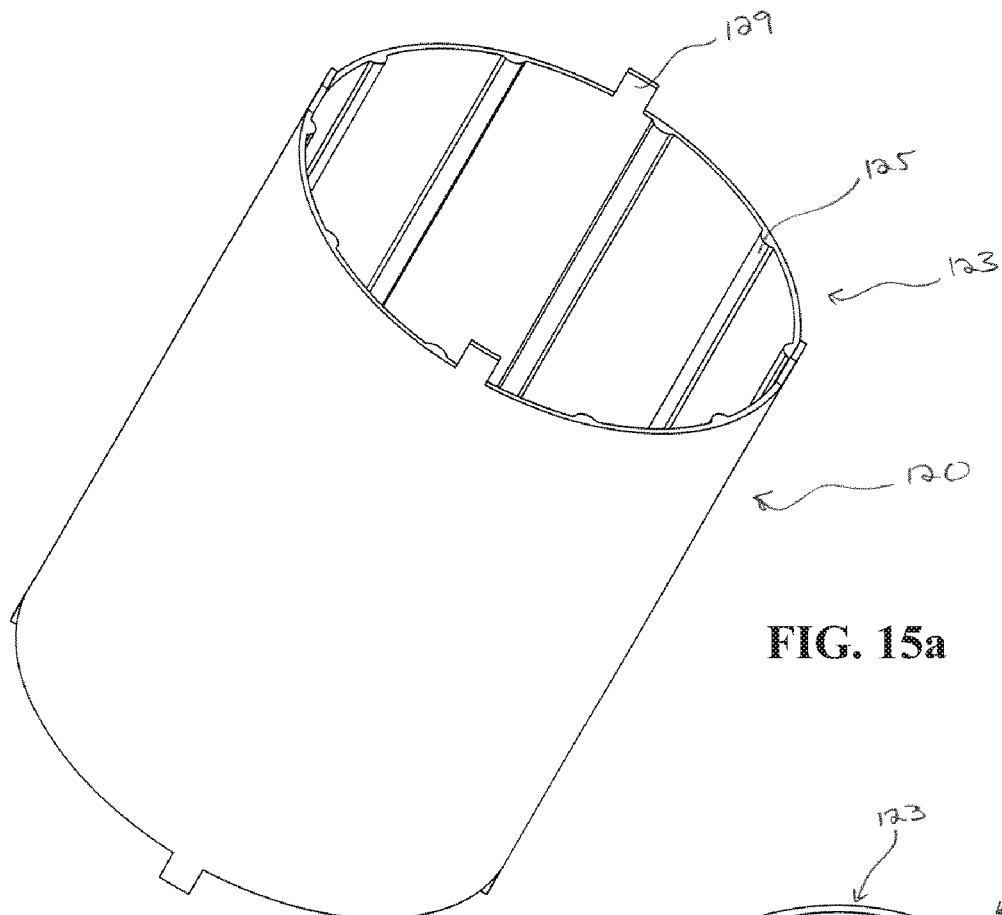
FIGS. 15a and 15b are perspective and bottom plan views of a fourth battery cell sleeve according to the present invention.
Figure 15B:
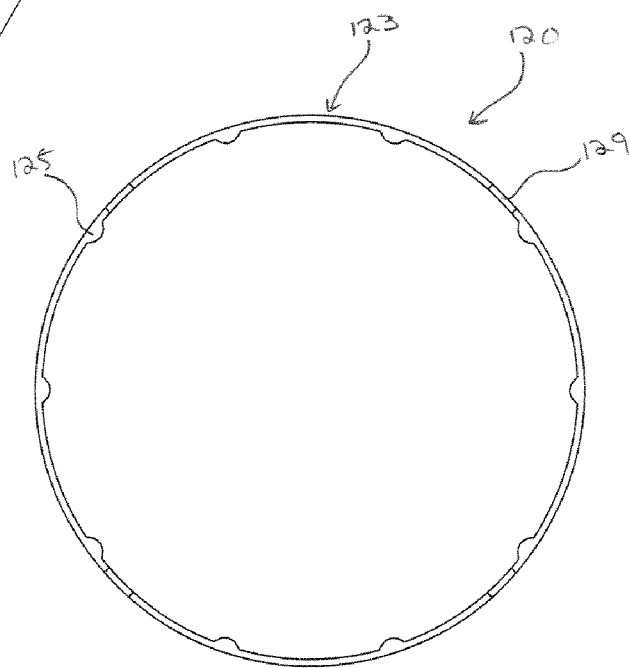

The raised ribs 76, 86 could provide additional gripping functionality through a sharp edge 77 along the ribs 76, as shown in FIGS. 10a and 10b, which may allow the ribs 76 to catch and hold the coil more easily, although in other embodiments such as that shown in FIGS. 11a and 11b the ribs 86 could have a rounded edge 87 to provide for increased surface area contact with the coil.

The inner faces 72, 82 of the sleeves 70, 80 and/or the sleeve grips 75, 85 can be protected with an anticorrosive material or coating that may be coated or plated onto the sleeves 70, 80 and/or the sleeve grips 75, 85. The sleeves 70, 80 and sleeve grips 75, 85 themselves could be made out of the anticorrosive material. The coating may be painted on or applied using techniques such as welding, cladding, or other adhesive techniques. It could also be plated onto the inner faces 72, 82 of the of the sleeves 70, 80 and onto the ribs 76, 86 by electroplating or electroless plating. The anticorrosive material could be copper, tin, a copper-tin alloy, zinc, silver, conductive carbon, brass, or combinations of the same, but the grips should be non-conductive. In some embodiments, the sleeve grips 75, 85 could be made out of polyether ether ketone (PEEK), polyphenylene sulfide (PPS), polytetrafluoroethylene (PTFE), perfluoroalkoxy (PFA), fluorinated ethylene propylene (FEP), or ethylene tetrafluoroethylene (ETFE). In other embodiments, the sleeve grips 75, 85 could be made out of a ceramic material.

In some embodiments, the inner diameter of the sleeve 70, 80 could be smaller than the outer diameter of the coil to be placed within the sleeve 70, 80 when in a relaxed position, so as require the coil to be under a slight compression when fit within the sleeve 70, 80 and so as to enable good contact between the inner face 72, 82 of the sleeve 70, 80 and the outer diameter of the coil.

The caps and sleeves could be used independently, or together to form a cell casing. For example, cap 10 could be used with a conventional sleeve, or sleeve 70 could be used with conventional cell caps.

In some embodiments, cap 10 could be used with sleeve 70 so as to provide cap grips 15 and sleeve grips 75 to provide additional gripping means to hold the coil in place and prevent it from unwinding during stick/slip of a downhole tool. The sleeve 70, 80 could be open at one or both ends, so up to two caps 10, 20, 30, 40, 50, 60 could be used with a given sleeve 70, 80, with the possibility of one cap 10, 20, 30, 40, 50, 60 on each open end 73, 83 of the sleeve 70, 80.

The perimeter edges of each open end 73, 83 of a sleeve 70, 80 could be sealed to a cap 10, 20, 30, 40, 50, 60. In some examples, the seal could be a hermetic seal making use of laser, ultrasonic, or welding techniques. In some embodiments, a gasket could be provided to electrically isolate the cap 10, 20, 30, 40, 50, 60 from the sleeve 70, 80.

The sleeve 70, 80 and caps 10, 20, 30, 40, 50, 60 could be made out of any high strength material, such as stainless steel, aluminum, tantalum, titanium, nickel, copper, tin, various alloys, laminates, and the like, but then would need a coating to be electrically insulated. The sleeve 70, 80 could be made out of the same or a different material than the caps 10, 20, 30, 40, 50, 60.

Referring now to FIGS. 12a to 15b, a sleeve 110, 120 could be indexed or locked to at least one cap 90, 100 closing off an open end 113, 123 of the sleeve 110, 120 to form an internal housing for receiving a coil. These keying features can keep the cap 90, 100 in fixed relation to the sleeve 110, 120. The open ends 113, 123 of the sleeves 110, 120 could have tabs 119, 129 to interlock with corresponding notches 99, 109 of the caps 90, 100. When the tabs 119, 129 mate with the notches 99, 109 and the cap 90, 100 is sealed to an open end 113, 123 of a sleeve 110, 120, the cap 90, 100 and sleeve 110, 120 will move together. As cap grips 95, 105 and sleeve grips 115, 125 grip the coil in the housing, the grips 95, 105 and 115, 125 could hold the entire length of the coil stationary relative to the housing. As such, these sleeves 110, 120 and caps 90, 100 could ensure that the coil moves with the entire tool. This could be important during stick/slip drilling operations or conditions for safety purposes, as keeping the coil from deforming or unrolling could prevent or reduce the risk of internal shorting.

The internal housing comprising a sleeve and at least one cap described above could be used in a device to supply power to a downhole tool. The device can comprise a high temperature rechargeable energy source, such as a battery. In some embodiments the battery could be a high temperature lithium battery. In some embodiments the battery could be used in petrochemical and offshore industries.

In some embodiments where the cap grips comprise ribs, the ribs can be arranged so as to radially cross the turns of the winding of coil. In some embodiments, the ribs could extend transversely across the coil windings.

In some embodiments, the coil may be surrounded by a wrapper to act as a further measure to prevent unwinding of the coil. The wrapper could be made out of tape or shrink wrap and can be adhered to the rolled coil.

During stick/slip, the caps could ensure that the coil moves with the entire downhole tool and does not untwist due to torsional stresses on the cell. This could minimize the likelihood of internal shorting between an electrode and an electrode plate and/or casing that has a different polarity from the electrode. Thus, the stability of the battery can be improved.

Figure 16A:
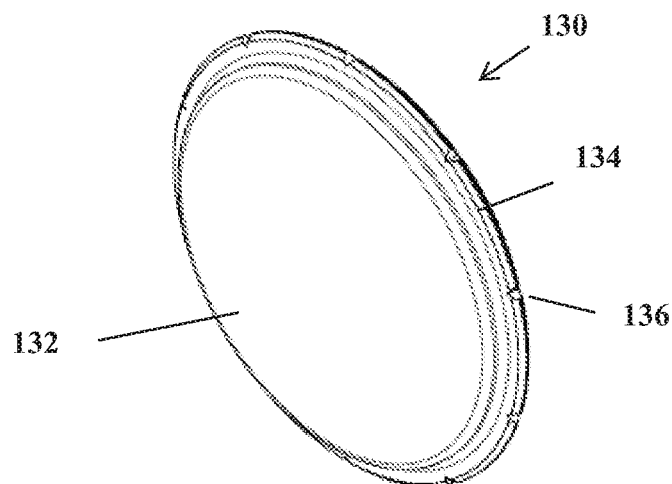
FIGS. 16a and 16b are perspective and bottom plan views of a first battery pouch cell according to the present invention.
Figure 16B:
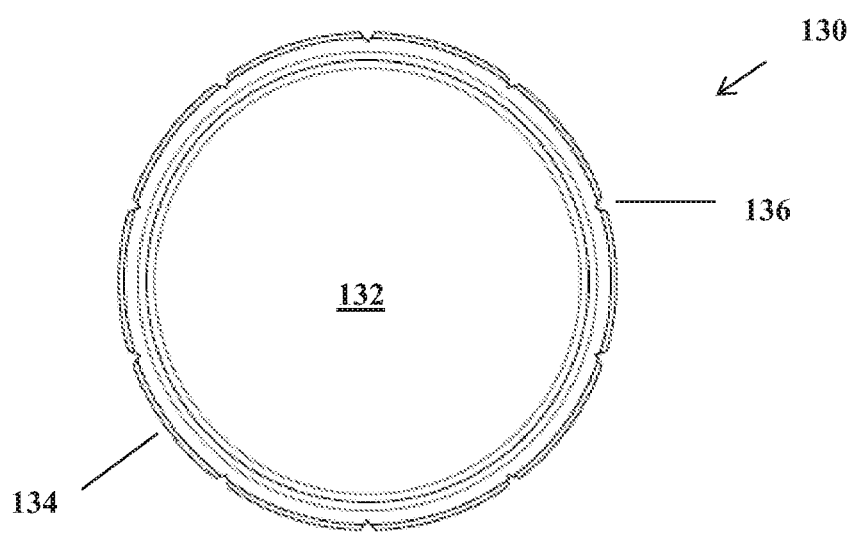

Turning now to FIGS. 16a and 16b, a first embodiment of a pouch cell 130 useful with certain aspects of the present invention is illustrated, the pouch cell having a body 132 and a peripheral edge 134, forming a disk. A pouch cell is a conventional battery cell type unlike the coil-type cells described above. In the exemplary embodiment of FIGS. 16a and 16b, however, the pouch cell 130 is provided with notches 136 on the peripheral edge 134, which notches 136 are configured for engagement with corresponding protuberances on the inner surface of a sleeve akin to those described above.

Figure 17A:
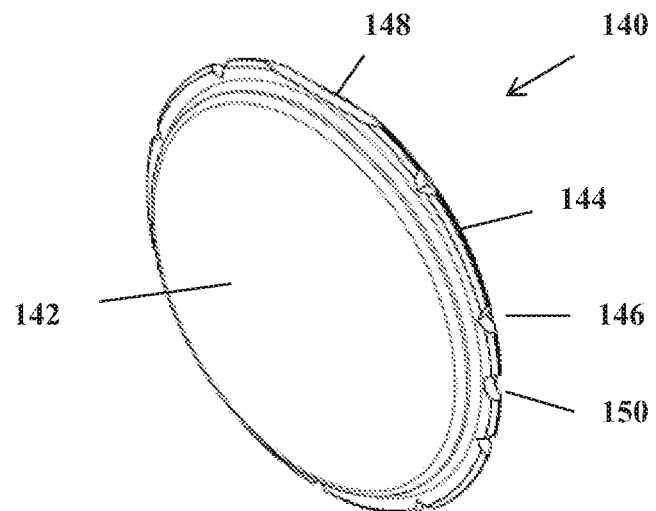
FIGS. 17a and 17b are perspective and bottom plan views of a second battery pouch cell according to the present invention.
Figure 17B:
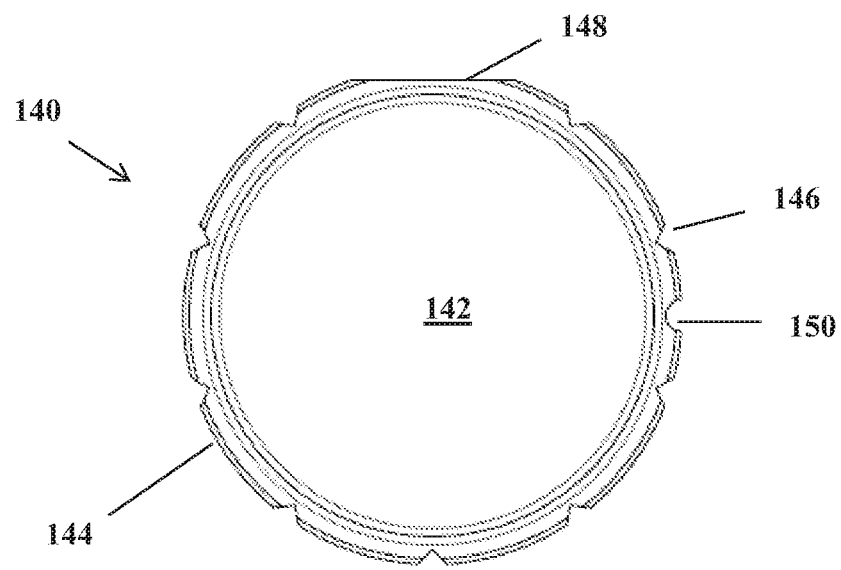

In the second embodiment of a pouch cell 140 illustrated in FIGS. 17a and 17b, an additional feature is added. In this embodiment, the pouch cell 140 comprises a body 142 and peripheral edge 144, and again the peripheral edge 144 is provided with notches 146 configured for engagement with corresponding protuberances on the inner surface of a sleeve akin to those described above. In this embodiment, the peripheral edge 144 is further provided with a flat notch 148 and a rounded notch 150 at 90 degrees. These additional features are intended to provide a means for aligning the pouch cell 140 within the sleeve, and thus it will be clear that they could take any number of forms and positions so long as they were distinct in shape, size or placement from the notches 146.

As will be clear from the above, those skilled in the art would be readily able to determine obvious variants capable of providing the described functionality, and all such variants and functional equivalents are intended to fall within the scope of the present invention.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g., a circuit, module, assembly, device, drill string component, drill rig system, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and systems have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

What is claimed:

1. A power supply comprising a battery cell adapted for supplying power to a downhole tool, the power supply comprising:
    a battery cell internals securing sleeve, the battery cell internals comprising a spiral-wound group of electrodes comprising at least one alternation of negative electrode, separator, and positive electrode, the battery cell internals securing sleeve comprising:
        a sleeve comprising a sleeve inner face; and
        at least one sleeve protuberance on the sleeve inner face configured to engage the battery cell internals;
    at least one cap disposed adjacent to an open end of the sleeve and sealed by a seal thereto comprising:
        an outer periphery and a cap inner face facing the battery cell internals;
        a current outlet terminal; and
        at least one cap protuberance protruding from the inner face, configured to engage the battery cell internals; and
    an electrolyte disposed within the battery cell
    wherein the length of the sleeve is shorter than that of the battery cell internals when the battery cell internals are in a relaxed position.

2. The power supply of claim 1 wherein the seal is a hermetic seal.

3. The power supply of claim 1 wherein the seal is achieved by one of plastic welding and e-beam welding.

4. The power supply of claim 1 further comprising a gasket disposed between the sleeve and the outer periphery of the at least one cap.

5. The power supply of claim 1 wherein the at least one cap and the sleeve comprise a keying feature to retain the at least one cap in fixed relation to the sleeve.

6. The power supply of claim 5 wherein the keying feature comprises at least one tab on the sleeve and at least one corresponding notch on the outer periphery of the cap.

7. The power supply of claim 1 wherein at least one of the at least one cap protuberance and the at least one sleeve protuberance comprises a barb, a prong, or a raised rib.

8. The power supply of claim 7 wherein the raised rib comprises a sharp inner edge or a rounded inner edge.

9. The power supply of claim 7 wherein at least one of the sleeve inner face, the cap inner face, the at least one cap protuberance, and the at least one sleeve protuberance is protected with an anticorrosive coating.

10. The power supply of claim 1 further comprising at least one feed-through aperture in the cap.

11. The power supply of claim 1 wherein at least one of the cap and the sleeve is injection molded.

12. The power supply of claim 1 wherein at least one of the at least one cap protuberance and the at least one sleeve protuberance comprises an electrical insulator.

13. The power supply of claim 1 wherein at least one of the at least one cap protuberance and the at least one sleeve protuberance is chemically inert.

14. The power supply of claim 1 wherein the cap further comprises an electrical connection means to provide an electrical link between the cap and the battery cell internals.

15. The power supply of claim 1 further comprising a wrapper enclosing the battery cell internals.

16. The power supply of claim 1 wherein the cap is locked to the sleeve.

17. The power supply of claim 16 wherein the sleeve comprises at least one tab and the cap comprises at least one corresponding recess that locks the cap and the sleeve in fixed relation.

18. A method of manufacturing a cylindrical battery cell comprising the steps of:
    providing a battery cell internals securing sleeve comprising:
        a sleeve comprising a sleeve inner face; and
        at least one sleeve protuberance on the sleeve inner face configured to engage battery cell internals;
    providing the battery cell internals comprising a spiral-wound group of electrodes comprising at least one alternation of negative electrode, separator, and positive electrode, and inserting the battery cell internals into the sleeve;
    providing at least one cap comprising:
        an outer periphery and a cap inner face facing the battery cell internals;
        a current outlet terminal; and
        at least one cap protuberance protruding from the inner face and configured to engage the battery cell internals;
    sealing the at least one cap adjacent to an open end of the sleeve; and
    filling the cell with an electrolyte,
    wherein the sleeve comprises two open ends and further comprising the step of sealing one of the at least one cap adjacent each open end.

19. The method of claim 18 further comprising the step of positioning a gasket between the sleeve and the at least one cap.

20. The method of claim 18 further comprising engaging a keying feature to retain the at least one cap in fixed relation to the sleeve.

21. A power supply comprising a battery cell adapted for supplying power to a downhole tool, the power supply comprising:
    a battery cell internals securing sleeve, the battery cell internals comprising a spiral-wound group of electrodes comprising at least one alternation of negative electrode, separator, and positive electrode, the battery cell internals securing sleeve comprising:
        a sleeve comprising a sleeve inner face; and
        at least one sleeve protuberance on the sleeve inner face configured to engage the battery cell internals;
    at least one cap disposed adjacent to an open end of the sleeve and sealed by a seal thereto comprising:
        an outer periphery and a cap inner face facing the battery cell internals;
        a current outlet terminal; and
        at least one cap protuberance protruding from the inner face, configured to engage the battery cell internals; and
    an electrolyte disposed within the battery cell,
    wherein an inner diameter of the sleeve is smaller than an outer diameter of the battery cell internals when the battery cell internals are in a relaxed position.

22. The power supply of claim 21 wherein the seal is a hermetic seal.

23. The power supply of claim 21 wherein the seal is achieved by one of plastic welding and e-beam welding.

24. The power supply of claim 21 further comprising a gasket disposed between the sleeve and the outer periphery of the at least one cap.

25. The power supply of claim 21 wherein the at least one cap and the sleeve comprise a keying feature to retain the at least one cap in fixed relation to the sleeve.

26. The power supply of claim 25 wherein the keying feature comprises at least one tab on the sleeve and at least one corresponding notch on the outer periphery of the cap.

27. The power supply of claim 21 wherein at least one of the at least one cap protuberance and the at least one sleeve protuberance comprises a barb, a prong, or a raised rib.

28. The power supply of claim 27 wherein the raised rib comprises a sharp inner edge or a rounded inner edge.

29. The power supply of claim 27 wherein at least one of the sleeve inner face, the cap inner face, the at least one cap protuberance, and the at least one sleeve protuberance is protected with an anticorrosive coating.

30. The power supply of claim 21 further comprising at least one feed-through aperture in the cap.

31. The power supply of claim 21 wherein at least one of the cap and the sleeve is injection molded.

32. The power supply of claim 21 wherein at least one of the at least one cap protuberance and the at least one sleeve protuberance comprises an electrical insulator.

33. The power supply of claim 21 wherein at least one of the at least one cap protuberance and the at least one sleeve protuberance is chemically inert.

34. The power supply of claim 21 wherein the cap further comprises an electrical connection means to provide an electrical link between the cap and the battery cell internals.

35. The power supply of claim 21 further comprising a wrapper enclosing the battery cell internals.

36. The power supply of claim 21 wherein the cap is locked to the sleeve.

37. The power supply of claim 36 wherein the sleeve comprises at least one tab and the cap comprises at least one corresponding recess that locks the cap and the sleeve in fixed relation.

\* \* \* \* \*